United States Patent
Liu et al.

(10) Patent No.: US 8,923,118 B1
(45) Date of Patent: Dec. 30, 2014

(54) METHODS AND APPARATUS FOR CLEAR CHANNEL ASSESSMENT

(75) Inventors: Yong Liu, Campbell, CA (US); Harish Ramamurthy, Sunnyvale, CA (US); Raja Banerjea, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 295 days.

(21) Appl. No.: 13/034,421

(22) Filed: Feb. 24, 2011

Related U.S. Application Data

(60) Provisional application No. 61/307,782, filed on Feb. 24, 2010, provisional application No. 61/331,771, filed on May 5, 2010, provisional application No. 61/354,021, filed on Jun. 11, 2010, provisional application No. 61/362,238, filed on Jul. 7, 2010, provisional application No. 61/380,911, filed on Sep. 8, 2010, provisional application No. 61/389,631, filed on Oct. 4, 2010, provisional application No. 61/390,978, filed on Oct. 7, 2010, provisional application No. 61/407,269, filed on Oct. 27, 2010, provisional application No. 61/409,812, filed on Nov. 3, 2010, provisional application No. 61/412,361, filed on Nov. 10, 2010, provisional application No. 61/415,778, filed on Nov. 19, 2010.

(51) Int. Cl.
*G01R 31/08* (2006.01)

(52) U.S. Cl.
USPC .......................... 370/230; 370/252; 370/329

(58) Field of Classification Search
USPC .......................................... 370/252.329, 445
See application file for complete search history.

(56) References Cited

U.S. PATENT DOCUMENTS

| 5,613,194 A | 3/1997 | Olds et al. |
| 6,169,761 B1 | 1/2001 | Marcoccia et al. |

(Continued)

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

(Continued)

*Primary Examiner* — Yemane Mesfin
*Assistant Examiner* — Henry Baron

(57) ABSTRACT

In a communication system that utilizes at least a primary channel, a secondary channel, and a tertiary channel, a primary channel signal level in the primary channel is measured, and a secondary channel signal level in the secondary channel is measured. A first tertiary channel signal level in a first bandwidth portion of the tertiary channel is measured, and a second tertiary channel signal level in a second bandwidth portion of the tertiary channel is measured. It is determined whether the primary channel is idle based on the primary channel signal level, and it is determined whether the secondary channel is idle based on the secondary channel signal level. It is determined whether the tertiary channel is idle based on the first tertiary channel signal level and the second tertiary channel signal level. It is determined whether a valid signal is received via a first composite channel including the primary channel, the secondary channel, and the tertiary channel. A first composite channel signal level in the first composite channel is measured at least when it is determined that a valid signal was received via the first composite channel. It is determined whether the first composite channel is idle based on i) whether a valid signal was received via the first composite channel and ii) the first composite channel signal level at least when it is determined that a valid signal was received via the first composite channel.

14 Claims, 13 Drawing Sheets

(56) References Cited

U.S. PATENT DOCUMENTS

| | | | |
|---|---|---|---|
| 8,345,584 | B2 | 1/2013 | Rohfleisch et al. |
| 8,670,399 | B2 | 3/2014 | Liu et al. |
| 2006/0146869 | A1 | 7/2006 | Zhang et al. |
| 2006/0217125 | A1 | 9/2006 | Miyazaki |
| 2006/0268760 | A1 | 11/2006 | Fang et al. |
| 2007/0008884 | A1 | 1/2007 | Tang |
| 2007/0060155 | A1 | 3/2007 | Kahana et al. |
| 2007/0070922 | A1 | 3/2007 | Benveniste |
| 2008/0080553 | A1 | 4/2008 | Hasty et al. |
| 2008/0112340 | A1 | 5/2008 | Luebke |
| 2008/0192644 | A1 | 8/2008 | Utsunomiya et al. |
| 2009/0059877 | A1 | 3/2009 | Utsunomiya et al. |
| 2009/0067403 | A1 | 3/2009 | Chan et al. |
| 2009/0285116 | A1* | 11/2009 | Nanda et al. ............ 370/252 |
| 2010/0142468 | A1 | 6/2010 | Cheong et al. |
| 2011/0194542 | A1 | 8/2011 | Kim et al. |
| 2011/0305156 | A1 | 12/2011 | Liu et al. |
| 2011/0305288 | A1 | 12/2011 | Liu et al. |
| 2011/0310930 | A1* | 12/2011 | Gerhardt et al. ............ 375/132 |
| 2012/0057492 | A1* | 3/2012 | Goel et al. ............ 370/252 |
| 2012/0057534 | A1 | 3/2012 | Park |
| 2012/0082040 | A1 | 4/2012 | Gong et al. |
| 2012/0082045 | A1 | 4/2012 | Liu et al. |
| 2012/0082056 | A1* | 4/2012 | Horisaki et al. ............ 370/252 |
| 2012/0082147 | A1 | 4/2012 | Liu et al. |
| 2013/0070668 | A1 | 3/2013 | Merlin et al. |

OTHER PUBLICATIONS

IEEE Std 802.11b-2001 (Corrigendum to IEEE Std 802.11b-1999) "IEEE Standard for Information technology—Telecommunications and information exchange between systems-Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.,* Nov. 7, 2001.

IEEE Std 802.11g/D8.2, Apr. 2003 (Supplement to ANSI/IEEE Std 802.11, 1999.(Reaff 2003)) "Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band, *"The Institute of Electrical and Electronics Engineers, Inc.,* Apr. 2003.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.,* (1999).

"IEEE Std. 802.11n™ IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.,* Oct. 2009.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.,* (1999).

Yuan, et al., "Carrier Aggregation for LTE-Advanced Mobile Communication Systems," IEEE Communications Magazine, pp. 88-93, Feb. 2010.

Cariou, et al., "Multi-channel Transmissions," Doc. No. IEEE 802.11-09/1022r0, The Institute of Electrical and Electronics Engineers, Inc., Sep. 2009.

Noh, et al., "Channel Selection and Management for 11ac," Doc. No. IEEE 802.11-10/0593r1, The Institute of Electrical and Electronic Engineers, Inc., May 20, 2010.

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.,* doc.: IEEE 802.11—04/0889r6, May 2005.

"IEEE P802.11n™/D3.00, Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.,* Sep. 2007.

U.S. Appl. No. 13/034,409, Liu et al., filed Feb. 24, 2011.

Park, "IEEE 802.11ac: Dynamic Bandwidth Channel Acccess," 2011 Int'l Conf. on Communications (ICC), pp. 1-5, 2011.

Redieteab, et al., "Cros-Layer Multichannel Aggregation for Future WLAN Systems," Institute of Electrical and Electronics Engineers, Inc., 2010.

Zhang et al., "11ac Explicit Sounding and Feedback", *The Institute of Electrical and Electronics Engineers,* doc. No. IEEE 802.11-10/1105r0, (Sep. 2010).

Stacey et al., "Specification Framework for TGac," document No. IEEE 802.11-09/0992r20, *Institute for Electrical and Electronics Engineers,* pp. 1-49, Jan. 18, 2011.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Office Action in U.S. Appl. No. 13/152,040, Liu et al., mailed Apr. 8, 2013.

Office Action in U.S. Appl. No. 13/152,044, Liu et al., mailed Mar. 28, 2013.

Office Action in U.S. Appl. No. 13/034,409, Liu et al., mailed May 16, 2013.

P802.11ac/D2.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High Throughput for Operation in Bands below 6 GHz, Institute for Electrical and Electronics Engineers, Jan. 2012.

P802.11 ac/D3.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High Throughput for Operation in Bands below 6 GHz, Institute for Electrical and Electronics Engineers, Jun. 2012.

P802.11 ac/D4.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High Throughput for Operation in Bands below 6 GHz, Institute for Electrical and Electronics Engineers, Oct. 2012.

P802.11 ac/D5.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High Throughput for Operation in Bands below 6 GHz, Institute for Electrical and Electronics Engineers, Jan. 2013.

P802.11 ac/D6.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High

(56) References Cited

OTHER PUBLICATIONS

Throughput for Operation in Bands below 6 GHz, Institute for Electrical and Electronics Engineers, Jul. 2013.
Stacey et al., "Specification Framework for TGac," document No. IEEE 802.11-09/0992r21, Institute for Electrical and Electronics Engineers, Jan. 19, 2011.
Stacey et al., "Specification Framework for TGac," document No. IEEE 802.11-09/0992r18, Institute for Electrical and Electronics Engineers, Sep. 16, 2010.
Partial International Search report for International Application No. PCT/US2011/038929, dated Feb. 16, 2012.
International Search Report and Written Opinion for International Application No. PCT/US2011/038929, dated Jun. 14, 2012.
Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.
International Search report and Written Opinion for International Application No. PCT/US2011/053437, dated Jun. 14, 2012.
Partial International Search Report for International Application No. PCT/US2011/053437, dated Feb. 8, 2012.
Office Action in U.S. Appl. No. 13/152,044, dated Aug. 29, 2013.
Office Action in U.S. Appl. No. 13/246,351, dated Aug. 30, 2013.
Office Action in U.S. Appl. No. 13/246,469, dated Jun. 10, 2013.

* cited by examiner

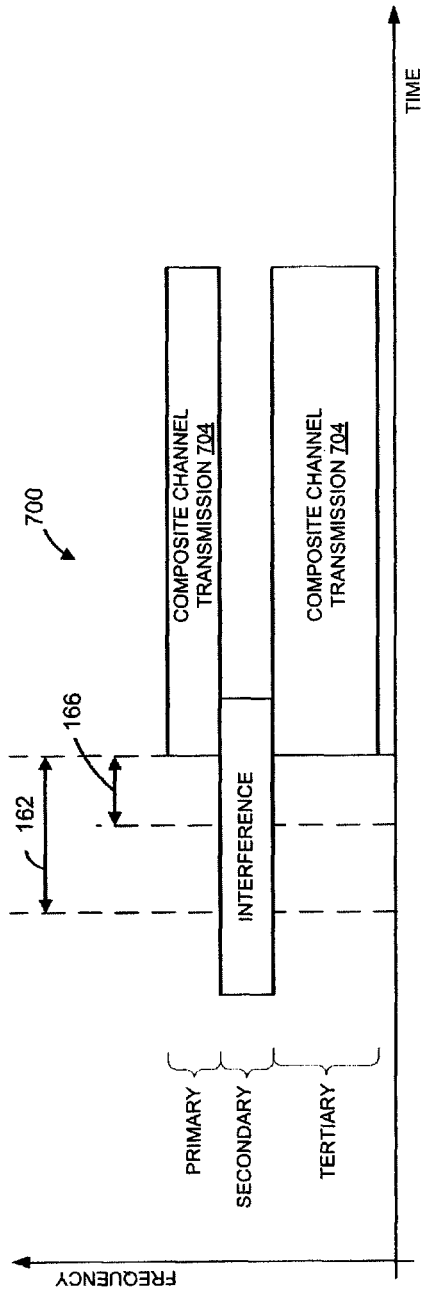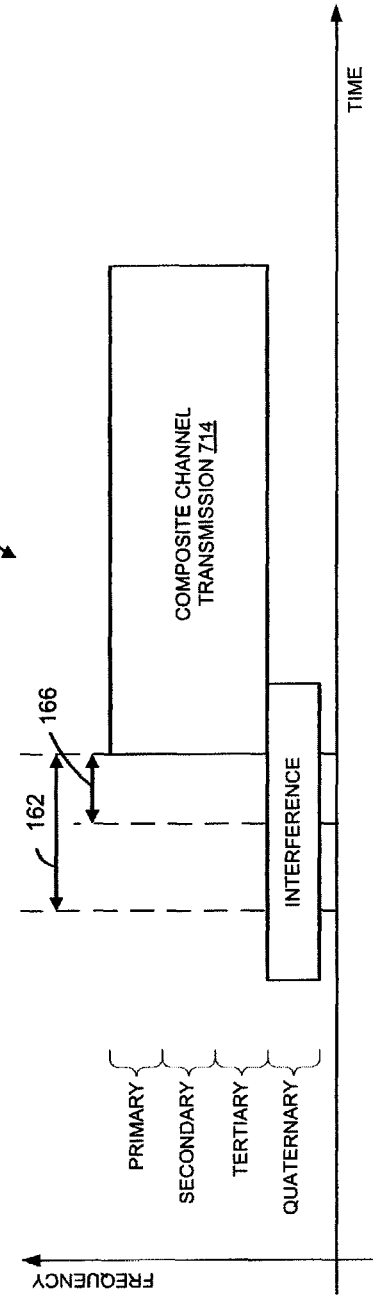

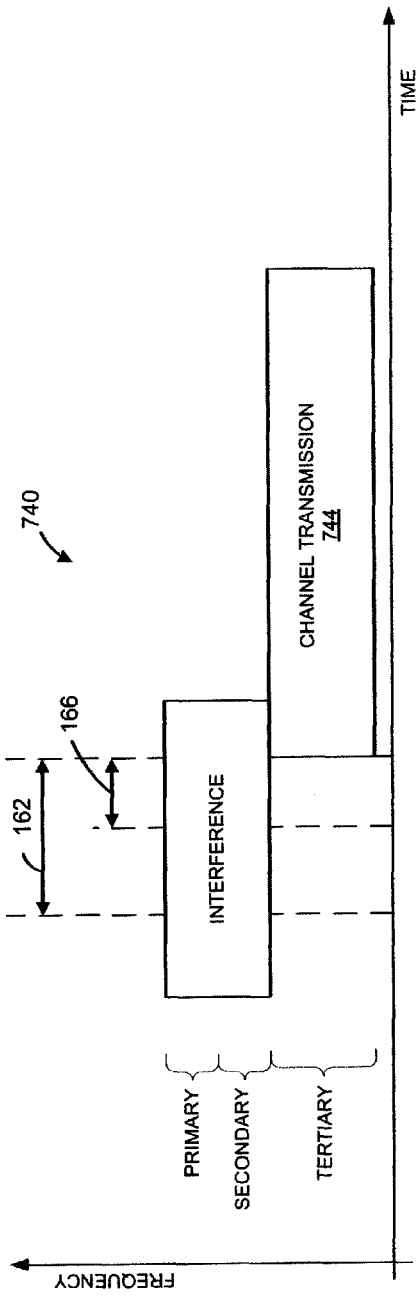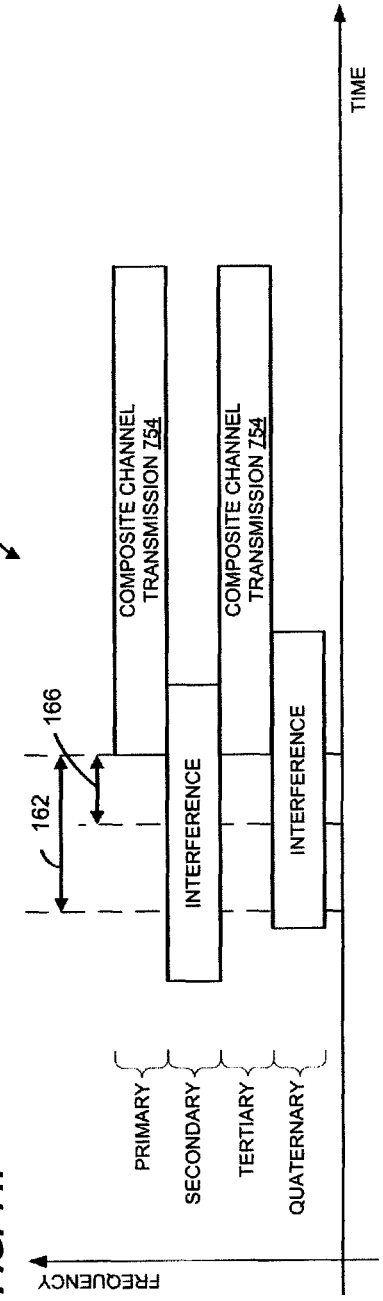

METHODS AND APPARATUS FOR CLEAR CHANNEL ASSESSMENT

CROSS-REFERENCES TO RELATED APPLICATION

This disclosure claims the benefit of the following U.S. Provisional Patent Applications:

U.S. Provisional Patent Application No. 61/307,782, entitled "VHT Jumbo Bandwidth Support," filed on Feb. 24, 2010;

U.S. Provisional Patent Application No. 61/331,771, entitled "VHT Jumbo Bandwidth Support," filed May 5, 2010;

U.S. Provisional Patent Application No. 61/354,021, entitled "Multi-Channel NAV Assertion," filed Jun. 11, 2010;

U.S. Provisional Patent Application No. 61/362,238, entitled "Multiple Channel Access," filed Jul. 7, 2010;

U.S. Provisional Patent Application No. 61/380,911, entitled "Multi-Channel NAV Assertion," filed Sep. 8, 2010;

U.S. Provisional Patent Application No. 61/389,631, entitled "VHT Wide BW Indication," filed Oct. 4, 2010;

U.S. Provisional Patent Application No. 61/390,978, entitled "VHT Wide BW Indication," filed Oct. 7, 2010;

U.S. Provisional Patent Application No. 61/407,269, entitled "VHT Wide BW Indication," filed Oct. 27, 2010;

U.S. Provisional Patent Application No. 61/409,812, entitled "VHT Wide BW Indication," filed Nov. 3, 2010;

U.S. Provisional Patent Application No. 61/412,361, entitled "VHT Wide BW Indication," filed Nov. 10, 2010; and U.S. Provisional Patent Application No. 61/415,778, entitled "VHT Wide BW Indication," filed Nov. 19, 2010.

The disclosures of all of the above-referenced patent applications are hereby applied incorporated by reference herein in their entireties.

The present application is related to U.S. patent application Ser. No. 13/034,409 (now U.S. Pat. No. 8,811,203) entitled "Methods and Apparatus for Determining a Composite Channel," filed on the same day as the present application, and which is hereby incorporated by reference herein in its entirety.

FIELD OF TECHNOLOGY

The present disclosure relates generally to communication systems and, more particularly, to wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11 ac, that promises to provide even greater throughput

SUMMARY

In another embodiment, a method of performing clear channel assessment (CCA) in a communication system that utilizes at least a primary channel, a secondary channel, and a tertiary channel comprises measuring a primary channel signal level in the primary channel, and measuring a secondary channel signal level in the secondary channel. The method also comprises measuring a first tertiary channel signal level in a first bandwidth portion of the tertiary channel, and measuring a second tertiary channel signal level in a second bandwidth portion of the tertiary channel. Additionally, the method comprises determining whether the primary channel is idle based on the primary channel signal level, and determining whether the secondary channel is idle based on the secondary channel signal level. Further, the method comprises determining whether the tertiary channel is idle based on the first tertiary channel signal level and the second tertiary channel signal level, and determining whether a valid signal is received via a first composite channel including the primary channel, the secondary channel, and the tertiary channel. Still further, the method comprises measuring a first composite channel signal level in the first composite channel at least when it is determined that a valid signal was received via the first composite channel, and determining whether the first composite channel is idle based on i) whether a valid signal was received via the first composite channel and ii) the first composite channel signal level at least when it is determined that a valid signal was received via the first composite channel. In another embodiment, a network interface is configured to perform the acts of the method described above.

In various embodiments, the method further comprises or the network interface is further configured to implement zero, one or more of the following features or any combination of one or more of the following features.

Determining whether the tertiary channel is idle comprises determining that the tertiary channel is not idle when at least one of i) the first tertiary channel signal level meets a first threshold, and ii) the second tertiary channel signal level meets a second threshold.

The first threshold and the second threshold are equal.

The first threshold and the second threshold are based on a minimum modulation and coding rate sensitivity.

Measuring the primary channel signal level in the primary channel comprises making a first signal level measurement, and making a second signal level measurement at least when it is determined that a valid signal was received in the primary channel.

The method further comprises measuring a plurality of quaternary channel signal levels in a plurality of bandwidth portions of a quaternary channel, and determining whether the quaternary channel is idle based on the plurality of quaternary channel signal levels.

The method further comprises determining whether a valid signal is received via a second composite channel including the primary channel, the secondary channel, the tertiary channel, and the quaternary channel, and measuring a second composite channel signal level in the second composite channel at least when it is determined that a valid signal was received via the second composite channel. The method further comprises determining whether the second composite channel is idle based on i) whether a valid signal was received via the second composite channel and ii) the second composite channel signal level at least when it is determined that a valid signal was received via the second composite channel.

BRIEF DESCRIPTION OF THE DRAWINGS

FIGS. 11A-11F are diagrams of example transmissions utilizing composite channels (or a single channel), according to several embodiments.

DETAILED DESCRIPTION

Figure 1:
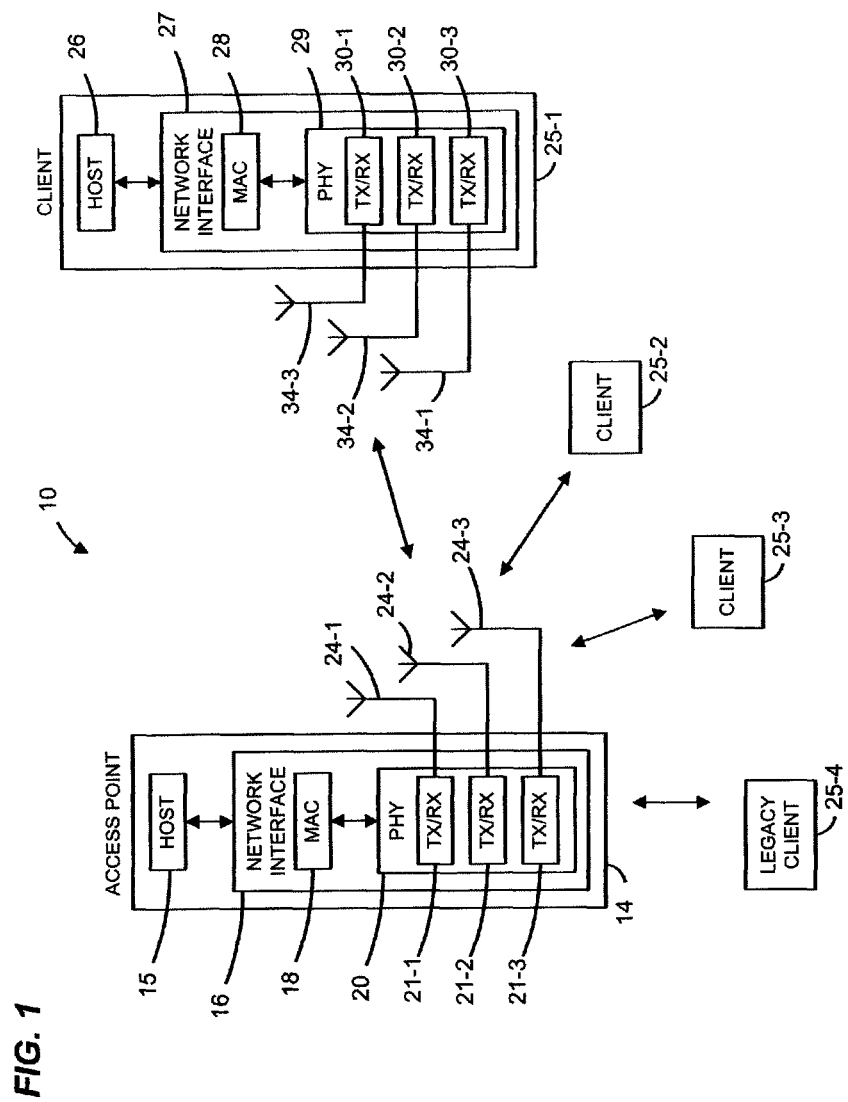
FIG. 1 is a block diagram of an example system that utilizes channel access and/or clear channel assessment techniques of the present disclosure, according to an embodiment.

In embodiments described below, a first communication device, such as an access point (AP) of a wireless local area network (WLAN), transmits a data stream to a second communication device, such as a client station, via a composite channel formed using one or more communication channels. The first communication device determines the composite communication channel based on status (e.g., busy or idle) of a set of communication channels including at least three communication channels. Generally, if a communication channel is idle, it can be used to form the composite channel.

In some embodiments, the set of communication channels includes at least a primary channel, a secondary channel, and a tertiary channel. In an embodiment, if the primary channel is busy (i.e., not idle) at a particular time, the composite channel cannot be utilized at that time. In an embodiment, if at a particular time the primary channel is idle, but the secondary channel is busy, the composite channel is formed at that time using the primary channel, but not the secondary channel nor the tertiary channel, even if the tertiary channel is idle. In another embodiment, if at a particular time the primary channel and the tertiary channel are idle, but the secondary channel is busy, the composite channel is formed at that time using the primary channel and the tertiary channel.

In some embodiments, channels in the set of communication channels have different bandwidths. In an embodiment having a primary channel, a secondary channel, and a tertiary channel, the primary channel and the secondary channel have a same bandwidth, whereas the tertiary channel has a bandwidth larger than the bandwidth of the primary channel (e.g., twice the bandwidth of the primary channel, etc.). In an embodiment, the set of communication channels further includes a quaternary channel having a bandwidth larger than the bandwidth of the tertiary channel (e.g., twice the bandwidth of the tertiary channel, etc.). As an illustrative example, the primary channel has a bandwidth of 20 MHz, the secondary channel has a bandwidth of 20 MHz, the tertiary channel has a bandwidth of 40 MHz, and the quaternary channel has a bandwidth of 80 MHz. As another illustrative example, the primary channel has a bandwidth of 10 MHz, the secondary channel has a bandwidth of 10 MHz, the tertiary channel has a bandwidth of 40 MHz, and the quaternary channel has a bandwidth of 60 MHz.

In other embodiments, the set of communication channels includes a primary channel, a secondary channel, a tertiary channel, a quaternary channel, and a quinary channel. In an embodiment, at least some of the primary channel, the secondary channel, the tertiary channel, the quaternary channel, and the quinary channel have different bandwidths. In an embodiment, the tertiary channel, the quaternary channel, and the quinary channel have the same bandwidth. As an illustrative example, the primary channel has a bandwidth of 20 MHz, the secondary channel has a bandwidth of 20 MHz, the tertiary channel has a bandwidth of 40 MHz, the quaternary channel has a bandwidth of 40 MHz, and the quinary channel has a bandwidth of 40 MHz.

In other embodiments, channels in the set of communication channels have bandwidths different than those discussed above. In an embodiment having a primary channel, a secondary channel, and a tertiary channel, for example, the primary channel, the secondary channel, and the tertiary channel have different bandwidths.

Thus, in some embodiments, the composite channel is formed using channels having different bandwidths, at least under some channel conditions.

On the other hand, in other embodiments having a primary channel, a secondary channel, and a tertiary channel, the primary channel, the secondary channel, and the tertiary channel all have the same bandwidth. Thus, in some embodiments, the composite channel is formed using communication channels having the same bandwidth.

Embodiments of clear channel assessment (CCA) techniques to determine whether communication channels are busy or idle are described below. These CCA techniques are utilized, in some embodiments, for determining which channels can be utilized in forming the composite channel.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol that supports aggregating three or more communication channels into a composite communication channel (e.g., the IEEE 802.11ac Standard, now in the process of being standardized), which is referred to herein as a "very high throughput (VHT) protocol". In another embodiment, the MAC unit 18 and the PHY unit 20 are also configured to operate according to a second communication protocol that supports aggregating at most two communication channels into a composite communication channel (e.g., the IEEE 802.11n Standard), which is referred to herein as a "high throughput (HT) protocol". In yet another embodiment, the MAC unit 18 and the PHY unit 20 are additionally configured to operate according to the second communication protocol and a third communication protocol that does not support aggregating communication channels into a composite communication channel (e.g., the IEEE 802.11a Standard)), which is referred to herein as a "legacy protocol".

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g. client station 25-1) is configured to operate at least according to the first communication protocol. In some embodiments, at least one of the client stations 25 (e.g., client station 25-4) is not configured to operate according to the first communication protocol but is configured to operate according to at least one of the second communication protocol or the third communication protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3 has a structure the same as or similar to the client station 25-1. In these embodiments, the client stations 25 structured like the client station 25-1 have the same or a different number of transceivers and antennas. For example, the client station 25-2 has only two transceivers and two antennas, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol and/or the third communication protocol.

In various embodiments, the PHY processing unit 20 of the AP 14 is configured to generate data units conforming to the first communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described hereinafter, according to various embodiments.

In various embodiments, the PHY unit 29 of the client device 25-1 is configured to generate data units conforming to the first communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY unit 29 of the client device 25-1 is configured to process received data units conforming to the first communication protocol and having formats described hereinafter, according to various embodiments.

Figure 2:
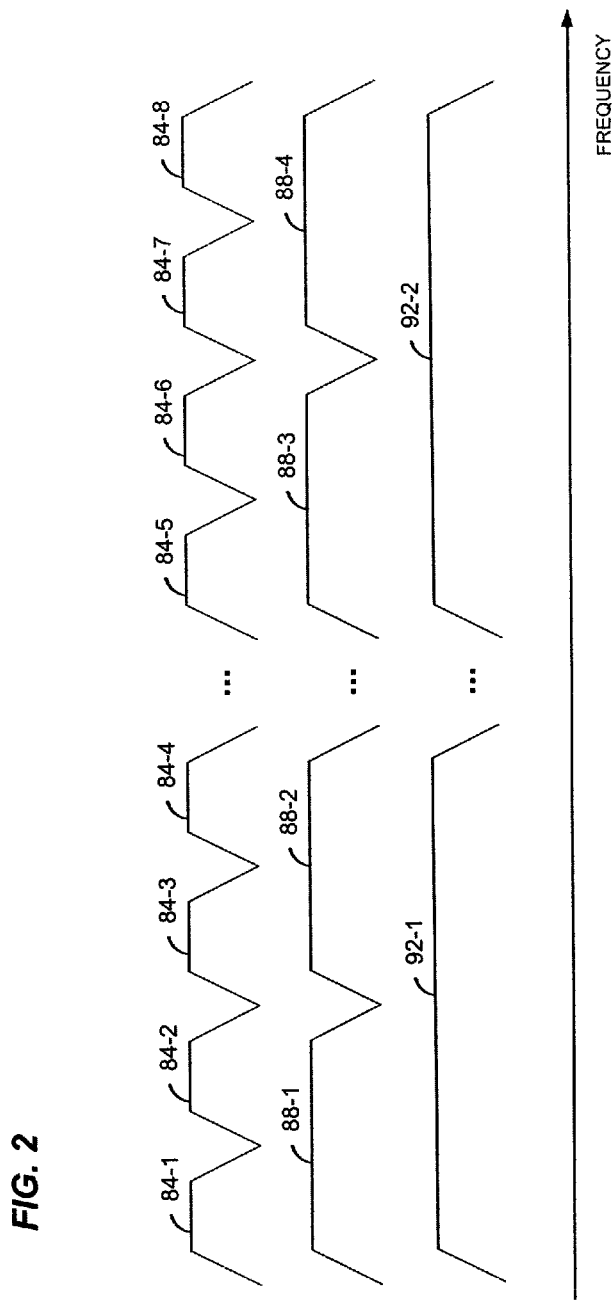
FIG. 2 is a diagram illustrating examples of communication channels utilized by a communication system such as the system 10 of FIG. 1, according to an embodiment.

FIG. 2 is a diagram illustrating examples of communication channels utilized by a communication system such as the system 10 of FIG. 1, according to an embodiment. A plurality of adjacent communication channels 84 can be concatenated to form a larger communication channel. For instance, two adjacent channels 84 can be concatenated to form a channel 88. For example, channels 84-1 and 84-2 can be concatenated to form channel 88-1. Similarly, channels 84-3 and 84-4 can be concatenated to form channel 88-2. On the other hand, four adjacent channels 84 can be concatenated to form a channel 92. For example, channels 84-1 through 84-4 can be concatenated to form channel 92-1. Similarly, channels 84-5 through 84-8 can be concatenated to form channel 92-2. Each channel 84 has a bandwidth of W, each channel 88 has a bandwidth of 2W, and each channel 92 has a bandwidth of 4W, according to an embodiment. W is a suitable bandwidth such as 1 MHz, 5 MHz, 10 MHz, 20 MHz, etc., in some embodiments.

A plurality of channels, such as channels illustrated in FIG. 2, can be combined to form a composite channel. A composite channel need not limited to a contiguous frequency band. For example, a composite channel having a bandwidth of 8W can be formed with channels 92-1 and 92-2, where channels 92-1 and 92-2 are not adjacent in frequency. As another example, channels 88-2 and 88-3 can be combined to form a composite channel having a bandwidth of 4W. As another example, channels 84-1 and 84-4 can be combined to form a composite channel having a bandwidth of 2W.

In some embodiments, not all channel combinations are permissible in forming a composite channel. For example, in an embodiment, for a given set of channels 84, a composite channel is not permitted to partially overlap with a channel 88. For example, a composite channel consisting of channels 84-2 and 84-3 is not permitted due to partial overlap with channels 88-1 and 88-2, and a composite channel consisting of channels 84-2 and 88-2 is not permitted due to partial overlap with channel 88-1, in an embodiment. Similarly, in an embodiment, a composite channel is not permitted to partially overlap with a channel 92. For example, a composite channel consisting of channels 88-2 and 88-3 is not permitted due to partial overlap with channels 92-1 and 92-2, and a composite channel consisting of channels 88-2 and 92-2 is not permitted due to partial overlap with channel 92-1, in an embodiment.

In other embodiments, a composite channel is permitted to partially overlap with a channel 88 and/or a channel 92. Thus, in some embodiments, a composite channel consisting of i) channels 84-2 and 84-3, ii) channels 84-2 and 88-2, ii) channels 88-2 and 88-3, and/or channels 88-2 and 92-2, for example, are permitted.

Figure 3:
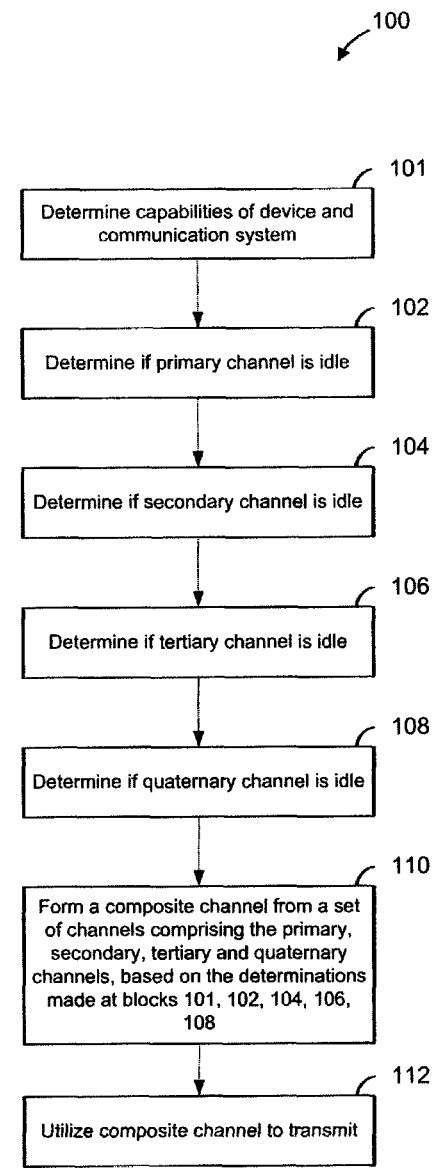
FIG. 3 is a flow diagram of an example method for determining and utilizing a composite channel formed from one or more of a primary channel, a secondary channel, a tertiary channel and a quaternary channel, according to an embodiment.

FIG. 3 is a flow diagram of an example method 100 for determining and utilizing a composite channel formed from one or more of a primary channel, a secondary channel, a tertiary channel and a quaternary channel, where the primary channel, the secondary channel, the tertiary channel, and the quaternary channel are non-overlapping channels, according to an embodiment. Referring to FIG. 1, the network interface 16 (e.g., the MAC processing unit 18 and/or the PHY processing unit 20) of the AP 14 is configured to implement the method 100, in an embodiment. Additionally or alternatively, the network interface 27 (e.g., the MAC processing unit 28 and/or the PHY processing unit 29) of the client 25-1 is configured to implement the method 100 in an embodiment.

In some embodiments, the primary channel and the secondary channel have a same bandwidth, whereas each of the tertiary channel and the quaternary channel has a bandwidth that is a respective multiple of the bandwidth of the primary channel and the secondary channel. For example, when the primary channel has a bandwidth W, the secondary channel has the bandwidth W, the tertiary channel has a bandwidth aW, where a is a positive integer, and the quaternary channel has a bandwidth bW, where b is a positive integer. In some embodiments, b>a. In some embodiments, a=2 and b=4. In other embodiments, different suitable values of a and b are utilized. In some embodiments, b≤a. In some embodiments, the primary channel, the secondary channel, the tertiary channel, and the quaternary channel have different bandwidths. In some embodiments, the primary channel and the secondary channel have different bandwidths, whereas the tertiary channel and the quaternary channel have the same bandwidth.

Merely for illustrative purposes, FIG. 3 will be described with reference to FIG. 2. For purposes of discussion, primary and secondary channels correspond to channels 84 with bandwidth W, tertiary channels correspond to channels 88 with bandwidth 2W (i.e., a=2), and quaternary channels correspond to channels 92 with bandwidth 4W (i.e., b=4). As discussed above, however, different suitable values of a and b are utilized in other implementations.

In some embodiments, as discussed above, not all channel combinations are permissible in forming a composite channel. If a composite channel is not permitted to partially overlap with a channel 88, for example, then the permissible choices of the secondary channel depend on a given primary channel. For example, if the primary channel is one of 84-1 or 84-2, the secondary channel is limited to the other one of channels 84-1 or 84-2, in an embodiment. Similarly, if a composite channel is not permitted to partially overlap with a channel 92, for example, then the permissible choices of the tertiary channel depend on a given primary channel. For example, if the primary channel and the secondary channel are channels 84-1 and 84-2, the tertiary channel is limited to channel 88-2, in an embodiment.

Also as discussed above, in some embodiments, a composite channel is permitted to partially overlap with a channel 88 and/or a channel 92. Thus, in some embodiments, for example, if the primary channel is one of 84-1 or 84-2, the secondary channel is chosen from the other one of channels 84-1 or 84-2, or channels 84-3, 84-4, etc., in an embodiment. As another example, if the primary channel and the secondary channel are channels 84-1 and 84-2, the tertiary channel is chosen from channels 88-2, 88-3, or 88-4, in an embodiment.

At block 101, capabilities, with regard to capabilities of transmitting/receiving via one or more of the secondary channel, the tertiary channel and the quaternary channel, of the device implementing the method 100 and of the communication system (e.g., basic service set (BSS)) in which it operates are determined whether the primary channel is idle. For example, the device implementing the method 100 may have a maximum bandwidth capability that precludes it from transmitting/receiving via all of the primary channel, the secondary channel, the tertiary channel and the quaternary channel. Similarly, other devices in the communication system may have maximum bandwidth capabilities that preclude the other devices from transmitting/receiving via all of the primary channel, the secondary channel, the tertiary channel and the quaternary channel.

At block 102, it is determined whether the primary channel is idle. In some embodiments, a suitable clear channel assessment (CCA) technique is utilized to determine whether the primary channel is idle. In some embodiments, a CCA technique such as described below is utilized. The primary channel is one of the channels 84, in an embodiment.

At block 104, it is determined whether the secondary channel is idle. In some embodiments, a CCA technique is utilized to determine whether the secondary channel is idle. In some embodiments, a CCA technique such as described below is utilized. The secondary channel is one of the channels 84, in an embodiment. The secondary channel is adjacent to the primary channel in an embodiment. In other embodiments, the secondary channel need not be adjacent to the primary channel.

At block 106, it is determined whether the tertiary channel is idle. In some embodiments, a CCA technique is utilized to determine whether the tertiary channel is idle. In some embodiments, a CCA technique such as described below is utilized. The tertiary channel is one of the channels 88, in an embodiment. The tertiary channel is adjacent to the primary channel or the secondary channel, in an embodiment. In other embodiments, the tertiary channel need not be adjacent to the primary channel nor the secondary channel.

At block 108, it is determined whether the quaternary channel is idle. In some embodiments, a CCA technique is utilized to determine whether the quaternary channel is idle. In some embodiments, a CCA technique such as described below is utilized. The quaternary channel is one of the channels 92, in an embodiment. The quaternary channel is adjacent to the primary channel, the secondary channel, or the tertiary channel, in an embodiment. In other embodiments, the quaternary channel need not be adjacent to any of the primary channel, the secondary channel, or the tertiary channel.

At block 110, a composite channel is formed from one or more channels from a set of channels including the primary channel, the secondary channel, the tertiary channel, and the quaternary channel, based on the determinations performed at blocks 101, 102, 104, 106, and 108. In general, the composite channel is formed using channels determined to be idle at blocks 102, 104, 106, and 108, provided that the device implementing the method 100 and other devices in the communication system are capable of transmitting/receiving via all of the primary channel, the secondary channel, etc. For example, if it is determined that the primary and secondary channels are idle, but that the tertiary and quaternary channels are not idle (i.e., busy), the composite channel is formed to consist of the primary channel and the secondary channel. As another example, if it is determined that the primary, secondary, and tertiary channels are idle, but that the quaternary channel is busy, the composite channel is formed to consist of the primary channel, the secondary channel, and the tertiary channel. In an embodiment, if it is determined that the primary, and secondary, and quaternary channels are idle, but that the tertiary channel is busy, the composite channel is formed to consist of the primary channel, the secondary channel, and the quaternary channel. In an embodiment, if it is determined that the tertiary and quaternary channels are idle, but that the primary and secondary channels are busy, the composite channel is formed to consist of the tertiary channel and the quaternary channel.

At block 112, the composite channel determined at block 110 is utilized to transmit information. For example, referring to FIG. 1, the AP 14 transmits information to one or more of the clients 25-1, 25-2, and 25-3 using the composite channel. As another example, the client 25-1 transmits information to the AP 14 using the composite channel.

Some or all of blocks 104, 106, and 108 are skipped based on the determination made at block 101, in some embodiments. For example, if it is determined at block 101 that the device implementing the method 100 and/or other devices in the communication system are not capable of transmitting/receiving via the quaternary channel, then block 108 is skipped and block 110 does not utilize a determination at block 108, in an embodiment. In other embodiments, as an example, if it is determined at block 101 that the device implementing the method 100 is capable of transmitting/receiving via the quaternary channel but that other devices in the communication system are not capable of transmitting/receiving via the quaternary channel, then block 108 is performed and block 110 does not utilize a determination at block 108.

Figure 4:
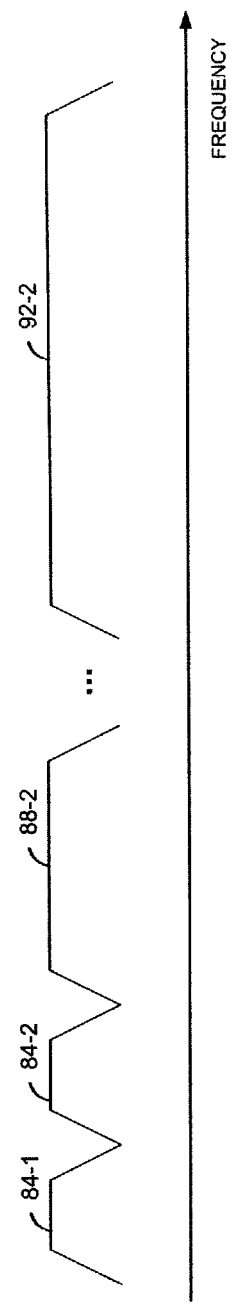
FIG. 4 is a diagram of an example composite channel formed according to the method of FIG. 3 when the primary, secondary, tertiary, and quaternary channels were determined to be idle, according to an embodiment.

FIG. 4 is a diagram of an example composite channel formed according to the method 200 when the primary, secondary, tertiary, and quaternary channels were determined to be idle, according to an embodiment. The example composite channel includes the primary channel 84-2, the secondary channel 84-1, the tertiary channel 88-2, and the quaternary channel 92-2. In one embodiment, the tertiary channel 88-2 and the quaternary channel 92-2 are adjacent in frequency. In another embodiment, the tertiary channel 88-2 and the quaternary channel 92-2 are not adjacent in frequency.

In some embodiments, each of the blocks in FIG. 3 is not performed in every instance. For example, whether a particular block is performed is dependent on a result of one or more other blocks, and block 110, when performed, does not utilize results of other blocks not performed, in some embodiments. In one embodiment, if at block 102 it is determined that the primary channel is busy, none of the other blocks are performed. In other words, if the primary channel is busy, the network interface 16 (or the network interface 27) determines that no transmission should occur at the present time, in an embodiment. For example, the network interface 16 (or the network interface 27) then waits for a period of time (e.g., at least a "back-off" time period) before performing the flow 200 again.

Similarly, in an embodiment, if at block 104 it is determined that the secondary channel is busy, blocks 106 and 108 are not performed. In this embodiment, at block 110, a composite channel is formed using only the primary channel (if the primary channel is idle), based on the determinations performed at blocks 102 and 104, but not blocks 106 and 108 (which were not performed). In other words, if the primary channel is idle and the secondary channel is busy, the network interface 16 (or the network interface 27) determines that the tertiary and quaternary channels should not be utilized and thus the composite channel is formed as merely the primary channel, in an embodiment.

Similarly, in an embodiment, if at block 106 it is determined that the tertiary channel is busy, block 108 is not performed. In this embodiment, at block 110, a composite channel is formed using only the primary channel and the secondary channel (if the primary channel and the secondary channel are idle), based on the determinations performed at blocks 102, 104, and 106, but not block 108 (which was not performed). In other words, if the primary channel and the secondary channel are idle and the tertiary channel is busy, the network interface 16 (or the network interface 27) determines that the quaternary channel should not be utilized and thus the composite channel is formed with the primary channel and the secondary channel, in an embodiment.

In embodiments in which all of blocks 104, 106, and 108 are performed, it is determined that one or more of the secondary channel, the tertiary channel, and the quaternary channel are not to be included in the composite channel regardless of whether the secondary channel, the tertiary channel, and/or the quaternary channel are idle. For example, if it is determined at block 104 that the secondary channel is busy, it may be determined at block 110 that the tertiary channel and the quaternary channel will not be included in the composite channel regardless of whether the tertiary channel or the quaternary channel are idle, in an embodiment. As another example, if it is determined at block 106 that the tertiary channel is busy, it may be determined at block 110 that the quaternary channel will not be included in the composite channel regardless of whether the quaternary channel is idle, in an embodiment. Thus, in some embodiments, a composite channel is formed at block 110 not based on at least some of the determinations made at blocks 104, 106, and 108, at least in some scenarios (such as when it is determined that the primary channel, the secondary channel, and/or the tertiary channel are busy).

In embodiments that do not utilize a quaternary channel, block 108 is omitted, and the formation of the composite channel at block 110 is therefore not based on a determination made at block 108. In some embodiments, one or more additional channels (e.g., quinary, senary, septenary, octonary, nonary, denary, etc.) are included. In these embodiments, a determination is made for each additional channel of whether the additional channel is idle, and formation of the composite channel is based on the determination(s) in a manner similar to that described above.

Figure 5:
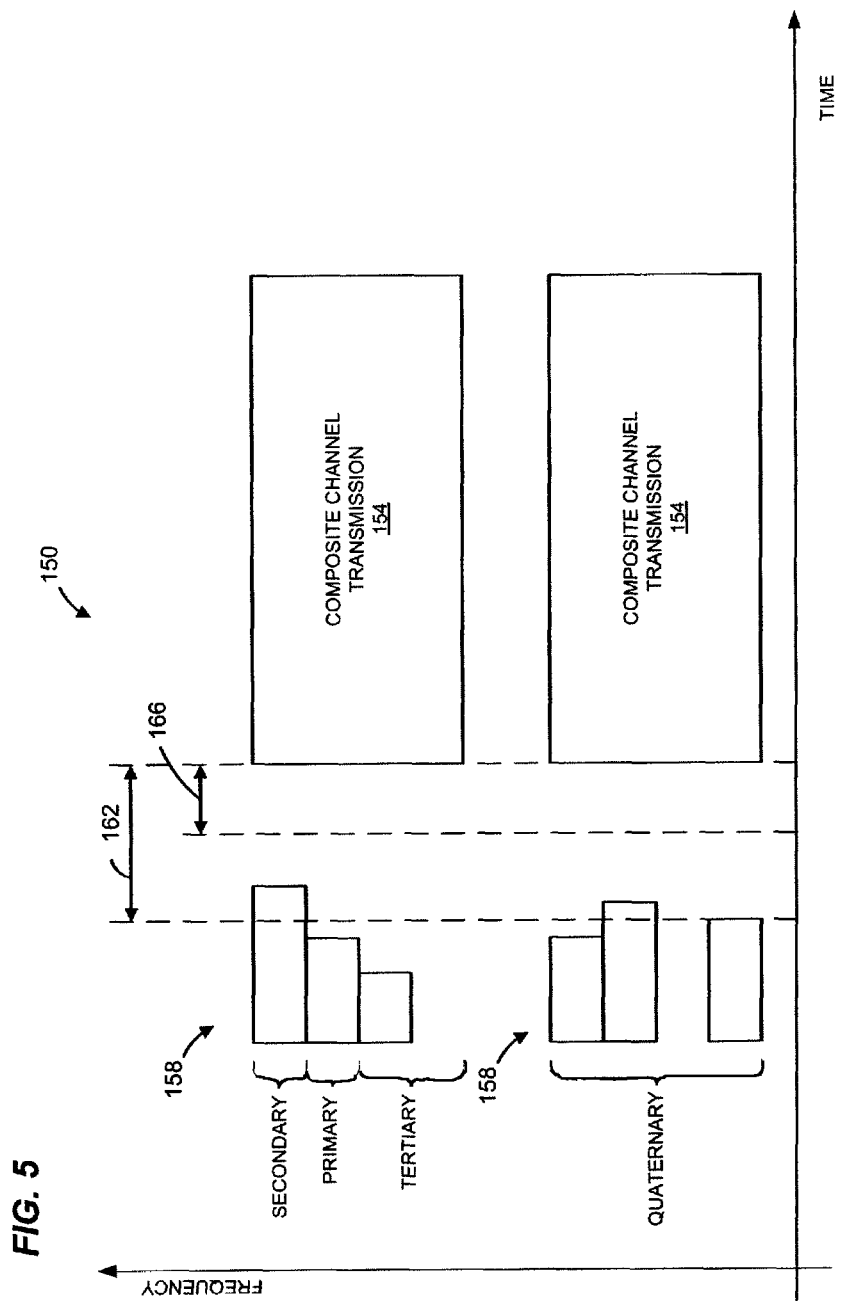
FIG. 5 is a diagram of an example transmission in a communication system utilizing a composite channel, according to an embodiment.

FIG. 5 is a diagram 150 of an example transmission in a communication system utilizing a composite channel such as described above, according to an embodiment. In the example illustrated in FIG. 5, a composite channel transmission 154 is transmitted via a composite channel comprising a primary channel, a secondary channel, a tertiary channel, and a quaternary channel. The composite transmission 154 is generated and transmitted by an AP such as the AP 14 (FIG. 1), or a client device, such as the client 25-1 (FIG. 1).

Interference 158 is present in the composite channel. The interference 158 corresponds to transmissions of another communication system, for example, such as a basic service set (BSS) different than a BSS to which the composite channel transmission 154 corresponds. As an example, the interference 158 is transmitted by or to an AP of another communication system.

With respect to the example method 100 of FIG. 3, determining whether a channel is idle comprises determining if the channel is idle for at least a particular period of time, in some embodiments. In some embodiments, the particular period of time varies depending on the type of channel. For example, referring to FIG. 5, it is determined whether the primary channel is idle for at least for a time period 162, whereas it is determined whether the secondary channel, the tertiary channel, and/or the quaternary channel are idle for at least for a time period 166, which is different than the time period 162. In an embodiment, the time period 166 is shorter than the time period 162, at least on average. In the example illustrated in FIG. 5, the primary channel was idle for at least the time period 162. Additionally, the secondary channel, the tertiary channel, and the quaternary channel each were idle for at least for the time period 166. Thus, the composite channel was determined to include all of the primary channel, the secondary channel, the tertiary channel, and the quaternary channel.

In some embodiments and/or scenarios, the time period 166 is a suitable defined and/or determined time period such as the arbitration interframe space (AIFS), the point coordination function (PCF) interframe space (PIFS), or the distributed coordination function (DCF) interframe space (DIFS) described in the IEEE 802.11 Standard. In some embodiments and/or scenarios, the time period 162 is a suitable time period determined based on the time period 166. For example, in an embodiment, the time period 162 is determined as a sum of the time period 166 with a suitable additional time period such as a back-off time period. In an embodiment, the back-off time period is a randomly generated time period such as described in the IEEE 802.11 Standard. As used herein, the term "randomly generated time period" encompasses pseudo-randomly generated time periods.

A communication system may operate in proximity to other communication systems and may share a set of channels with the other communication systems. Generally, in some embodiments, the communication system seeks to avoid overlapping a secondary, tertiary, quaternary, etc., communication channel with a primary channel of another communication system. In some scenarios in which the several communication systems operate in close proximity, however, it may be difficult to utilize composite communication channels and at the same time avoid overlap with primary channels of the other communication systems.

In some embodiments and/or scenarios, a secondary, tertiary, quaternary, etc., communication channel overlaps with a primary channel of another communication system. In one embodiment, determining whether the overlapping (with the primary channel of the other communication system) secondary channel, tertiary channel, or quaternary channel is idle comprises determining whether the channel is idle for at least the time period 162. In another embodiment, determining whether the overlapping secondary channel, tertiary channel, or quaternary channel is idle comprises determining whether the channel is idle for at least the time period 166. In another embodiment, a time period different than the time period 162 and the time period 166 is utilized for determining whether the overlapping secondary channel, tertiary channel, or quaternary channel is idle.

Figure 6:
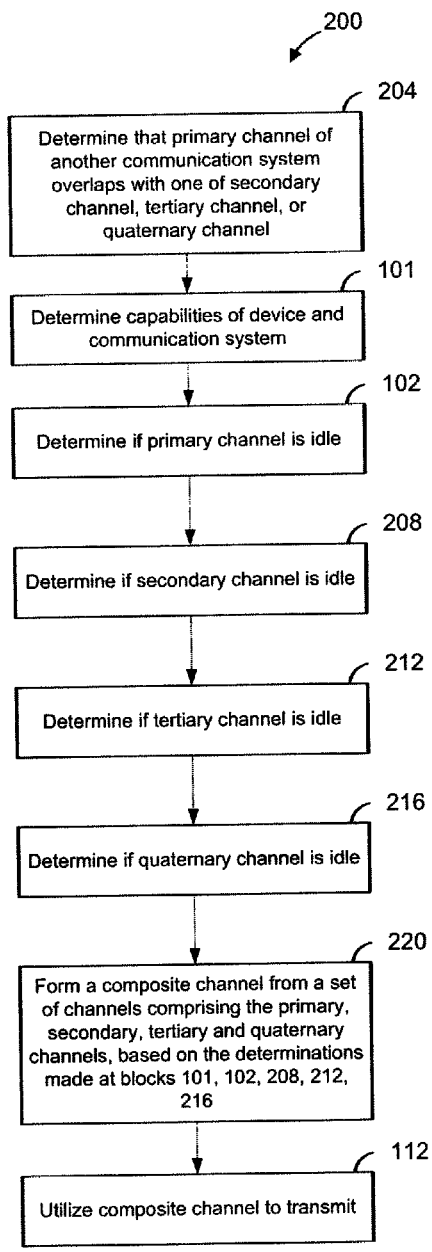
FIG. 6 is a flow diagram of another example method for determining and utilizing a composite channel formed from one or more of a primary channel, a secondary channel, a tertiary channel and a quaternary channel, according to another embodiment.

FIG. 6 is a flow diagram of an example method 200 for determining and utilizing a composite channel formed from one or more of a primary channel, a secondary channel, a tertiary channel and a quaternary channel, where the primary channel, the secondary channel, the tertiary channel, and the quaternary channel are non-overlapping channels, according to an embodiment. Referring to FIG. 1, the network interface 16 (e.g., the MAC processing unit 18 and/or the PHY processing unit 20) of the AP 14 is configured to implement the method 200, in an embodiment. Additionally or alternatively, the network interface 27 (e.g., the MAC processing unit 28 and/or the PHY processing unit 29) of the client 25-1 is configured to implement the method 200 in an embodiment. The example method 200 is similar to the example method 100 of FIG. 3, and like-numbered blocks are not discussed. Merely for illustrative purposes, FIG. 6 will be described with reference to FIGS. 2 and 6.

At block 204, it is determined that one of the secondary channel, the tertiary channel, or the quaternary channel of the communication system overlaps with a primary channel of another communication system. Any suitable technique for determining that one of the secondary channel, the tertiary channel, or the quaternary channel of the communication system overlaps with a primary channel of another communication system is utilized. In one embodiment, it is determined that a particular channel is being used by as a primary channel by another communication system based on decoding a signal transmitted by the other communication system in the channel.

At block 208, it is determined whether the secondary channel is idle. Block 208 is at least similar to block 104 of the method 100 (FIG. 3), in an embodiment. In one embodiment, block 208 comprises determining if the secondary channel is idle for at least the time period 166 (FIG. 5) regardless of whether the primary channel of the other communication system overlaps with the secondary channel. In another embodiment, block 208 comprises determining if the secondary channel is idle for at least the time period 162 (FIG. 5) if it was determined that the primary channel of the other communication system overlaps with the secondary channel.

In another embodiment, block 208 comprises determining if the secondary channel is idle for at least a time period different than the time period 162 and the time period 166 (FIG. 5), at least on average, if it was determined that the primary channel of the other communication system overlaps with the secondary channel. For example, in some embodiments in which the time period 162 is determined based on a randomly generated time period, e.g., a back-off time period such as discussed above, block 208 comprises determining if the secondary channel is idle for at least a time period that is determined based on a portion of the randomly generated time period, if it was determined that the primary channel of the other communication system overlaps with the secondary channel. For instance, the time period is determined based on factor*back-off, where factor is a value set between 0 and 1, and where back-off is a randomly generated back-off time period, in an embodiment. In an embodiment, the time period is determined based on the time period 166 added to factor*back-off, if it was determined that the primary channel of the other communication system overlaps with the secondary channel. In an embodiment in which the time period is determined based on the time period 166 added to factor*back-off, the value of factor is capable of being set between 0 and 1 so that when factor=0, the time period is the time period 166, and when factor=1 the time period is the time period 162.

In another embodiment, block 208 comprises determining if the secondary channel is idle for at least a first time period when it was determined that the primary channel of the other communication system does not overlap with the secondary channel, whereas it is determined if the secondary channel is idle for at least a second time period when it was determined that the primary channel of the other communication system overlaps with the secondary channel. In an embodiment, the second time period is longer than the first time period, at least in some scenarios. In some embodiments and/or scenarios, the first time period is PIFS, whereas the second time period is DIFS or AIFS, at least in some scenarios.

At block 212, it is determined whether the tertiary channel is idle. Block 212 is at least similar to block 106 of the method 100 (FIG. 3), in an embodiment. In one embodiment, block 212 comprises determining if the tertiary channel is idle for at least the time period 166 (FIG. 5) regardless of whether the primary channel of the other communication system overlaps with the tertiary channel. In another embodiment, block 212 comprises determining if the tertiary channel is idle for at least the time period 162 (FIG. 5) if it was determined that the primary channel of the other communication system overlaps with the tertiary channel.

In another embodiment, block 212 comprises determining if the tertiary channel is idle for at least a time period different than the time period 162 and the time period 166 (FIG. 5), at least on average, if it was determined that the primary channel of the other communication system overlaps with the tertiary channel. The different time period is determined in a manner such as described above with respect to block 208.

At block 216, it is determined whether the quaternary channel is idle. In some embodiments, a CCA technique is utilized to determine whether the quaternary channel is idle. Block 216 is at least similar to block 108 of the method 100 (FIG. 3), in an embodiment. In one embodiment, block 216 comprises determining if the quaternary channel is idle for at least the time period 166 (FIG. 5) regardless of whether the primary channel of the other communication system overlaps with the quaternary channel. In another embodiment, block 216 comprises determining if the quaternary channel is idle for at least the time period 162 (FIG. 5) if it was determined that the primary channel of the other communication system overlaps with the quaternary channel.

In another embodiment, block 216 comprises determining if the quaternary channel is idle for at least a time period different than the time period 162 and the time period 166 (FIG. 5), at least on average, if it was determined that the primary channel of the other communication system overlaps with the quaternary channel. The different time period is determined in a manner such as described above with respect to block 208.

At block 220, a composite channel is formed from one or more channels from a set of channels including the primary channel, the secondary channel, the tertiary channel, and the quaternary channel, based on the determinations performed at blocks 101, 102, 208, 212, and 216. Block 220 is similar to block 110 (FIG. 3).

In other embodiments, the method 200 is modified in ways similar to those discussed above with respect to the method 100 (FIG. 3).

In some embodiments, a communication device in a wireless communication system such as the system 10 of FIG. 1 maintains a network allocation vector (NAV) which is used to keep track of a duration of a current transmission. In some embodiments, the NAV is a counter. For example, when a communication device receives a valid frame, the communication device sets the NAV to a duration indicated in the received frame. In some embodiments, the NAV is updated in response to frames received via the primary channel, whereas the NAV is not updated in response to frames received via only non-primary channels. In other embodiments, the NAV is updated in response to frames received via any of the primary channel or non-primary channels.

In some embodiments, a station such as the AP 14 or the client 25-1 maintains a back-off counter that is used for the primary channel and for other channels such as a secondary channel, a tertiary channel, etc. In some embodiments, a station such as the AP 14 or the client 25-1 maintains a back-off counter for the primary channel (back-off_P) and also a back-off counter for each of other channels such as a secondary channel, a tertiary channel, etc., (back-off_S) that overlaps with a primary channel of another communication system. In an embodiment, when a secondary channel, a tertiary channel, etc., overlaps with a primary channel of another communication system, the station determines whether the secondary channel, the tertiary channel, etc., is idle for at least time period determined based on the primary back-off period (back-off_P) and the secondary back-off period (back-off_S). For example, in one embodiment, the station determines whether the secondary channel, the tertiary channel, etc., is idle for at least back-off_P+AIFS+back-off_S. If the secondary channel, the tertiary channel, etc., is not idle for at least time the period determined based on back-off_P and back-off_S, the channel cannot be utilized, in an embodiment. In an embodiment, if the secondary channel, the tertiary channel, etc., is not idle, the back-off_S timer is frozen. When the station has a new transmission on the secondary channel, the tertiary channel, etc., the back-off_S timer is restarted. In an embodiment, the back-off_S timer is frozen when the secondary channel, the tertiary channel, etc., overlapping with the primary channel of the other communication system is not used for other reasons, such when the channel is not part of an allowed composite channel.

Figure 7:
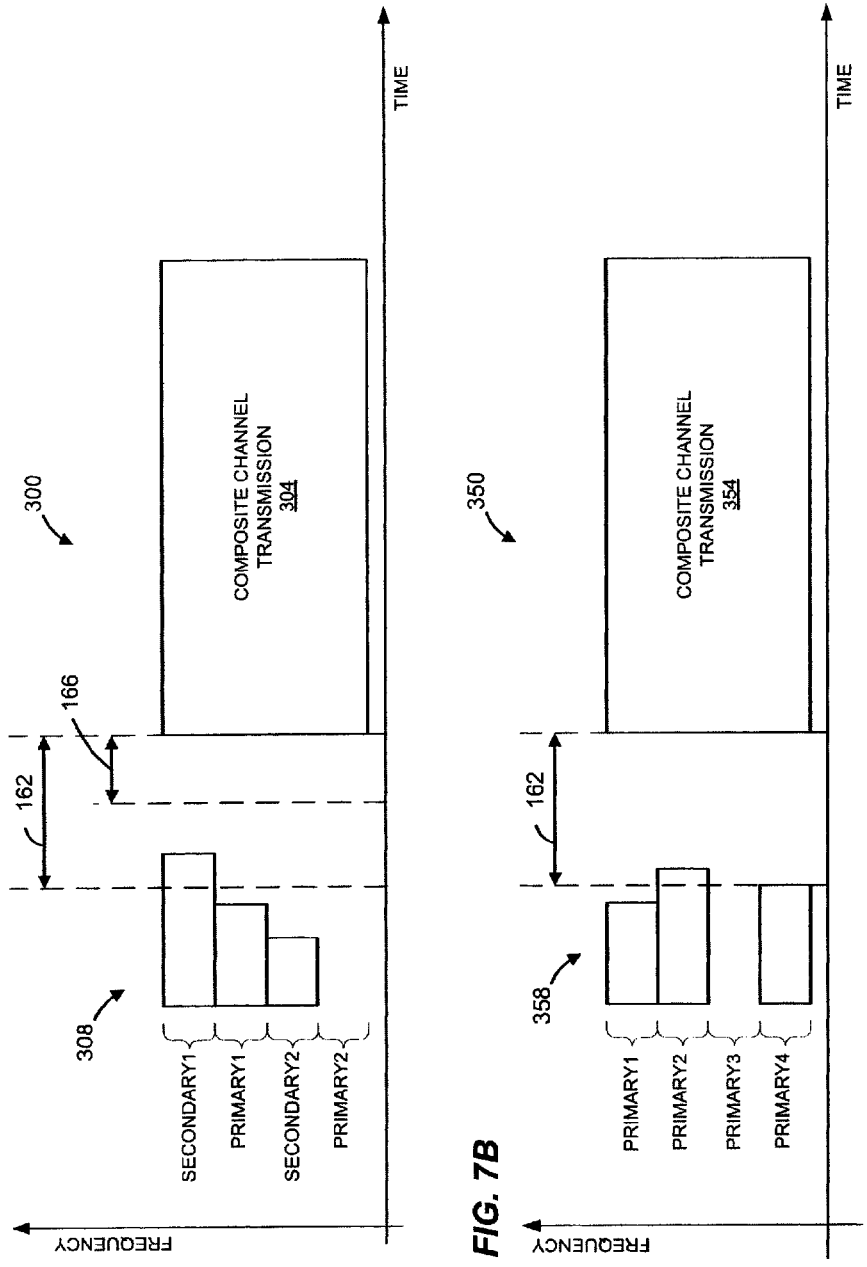
FIG. 7A is a diagram of an example transmission in a communication system utilizing a composite channel, according to an embodiment.
FIG. 7B is a diagram of another example transmission in a communication system utilizing a composite channel, according to another embodiment.

In some embodiments, a communication device can utilize multiple primary channels. FIG. 7A is a diagram 300 of an example transmission in a communication system utilizing a composite channel such as described above, according to an embodiment. In the example illustrated in FIG. 7A a composite channel transmission 304 is transmitted via a composite channel comprising a first primary channel (Primary 1), a first secondary channel (Secondary 1), a second primary channel (Primary 2), a second secondary channel (Secondary 2). The composite transmission 304 is generated and transmitted by an AP such as the AP 14 (FIG. 1), or a client device, such as the client 25-1 (FIG. 1).

Interference 308 is present in the composite channel. The interference 308 corresponds to transmissions of another communication system, for example, such as a basic service set (BSS) different than a BSS to which the composite channel transmission 304 corresponds. As an example, the interference 308 is transmitted by or to an AP of another communication system.

As discussed above, determining whether a channel is idle comprises determining if the channel is idle for at least a particular period of time, in some embodiments. In some embodiments, the particular period of time varies depending on the type of channel. For example, referring to FIG. 7A, it is determined whether each primary channel is idle for at least for the time period 162, whereas it is determined whether each secondary is idle for at least for the time period 166, which is different than the time period 162. In an embodiment, the time period 166 is shorter than the time period 162, at least on average. In the example illustrated in FIG. 7A, the first primary channel and the second primary channel were idle for at least the time period 162. Additionally, the first secondary channel and the second secondary channel each were idle for at least for the time period 166. Thus, the composite channel 304 was determined to include all of the illustrated channels.

FIG. 7B is a diagram 350 of an example transmission in a communication system utilizing a composite channel such as described above, according to an embodiment. In the example illustrated in FIG. 7B a composite channel transmission 354 is transmitted via a composite channel comprising a first primary channel (Primary 1), a second primary channel (Primary 2), a third primary channel (Primary 3), and a fourth primary channel (Primary 4). The composite transmission 354 is generated and transmitted by an AP such as the AP 14 (FIG. 1), or a client device, such as the client 25-1 (FIG. 1).

In some embodiments, the time periods utilized to determine whether multiple primary channels are idle are different. For example, in the examples of FIGS. 7A and 7B, the time period utilized with respect to the second primary channel is longer than the time period utilized with respect to the first primary channel, in an embodiment. Similarly, in the example of FIG. 7B, the time period utilized with respect to the third primary channel is longer than the time period utilized with respect to the second primary channel, and the time period utilized with respect to the fourth primary channel is longer than the time period utilized with respect to the third primary channel, in an embodiment.

Interference 358 is present in the composite channel. The interference 358 corresponds to transmissions of another communication system, for example, such as a basic service set (BSS) different than a BSS to which the composite channel transmission 354 corresponds. As an example, the interference 358 is transmitted by or to an AP of another communication system.

As discussed above, determining whether a channel is idle comprises determining if the channel is idle for at least a particular period of time, in some embodiments. For example, referring to FIG. 7B, it is determined whether each primary channel is idle for at least for the time period 162. In the example illustrated in FIG. 7B, all of the primary channels were idle for at least the time period 162. Thus, the composite channel 354 was determined to include all of the illustrated channels.

In some embodiments and/or scenarios, the time period 166 is a suitable defined and/or determined time period such as the arbitration interframe space (AIFS), the point coordination function (PCF) interframe space (PIFS), or the distributed coordination function (DCF) interframe space (DIFS) described in the IEEE 802.11 Standard. In some embodiments and/or scenarios, the time period 162 is a suitable time period determined based on the time period 166. For example, in an embodiment, the time period 162 is determined as a sum of the time period 162 with a suitable additional time period such as a back-off time period. In an embodiment, the back-off time period is a randomly generated time period such as described in the IEEE 802.11 Standard. As used herein, the term "randomly generated time period" encompasses pseudo-randomly generated time periods.

Embodiments of example CCA techniques for systems utilizing a primary channel, a secondary channel, a tertiary channel, etc., will now be described. In some embodiments, CCA techniques such as the CCA techniques to be described are utilized in determining whether primary channels, secondary channels, tertiary channels, etc., are busy.

Figure 8:
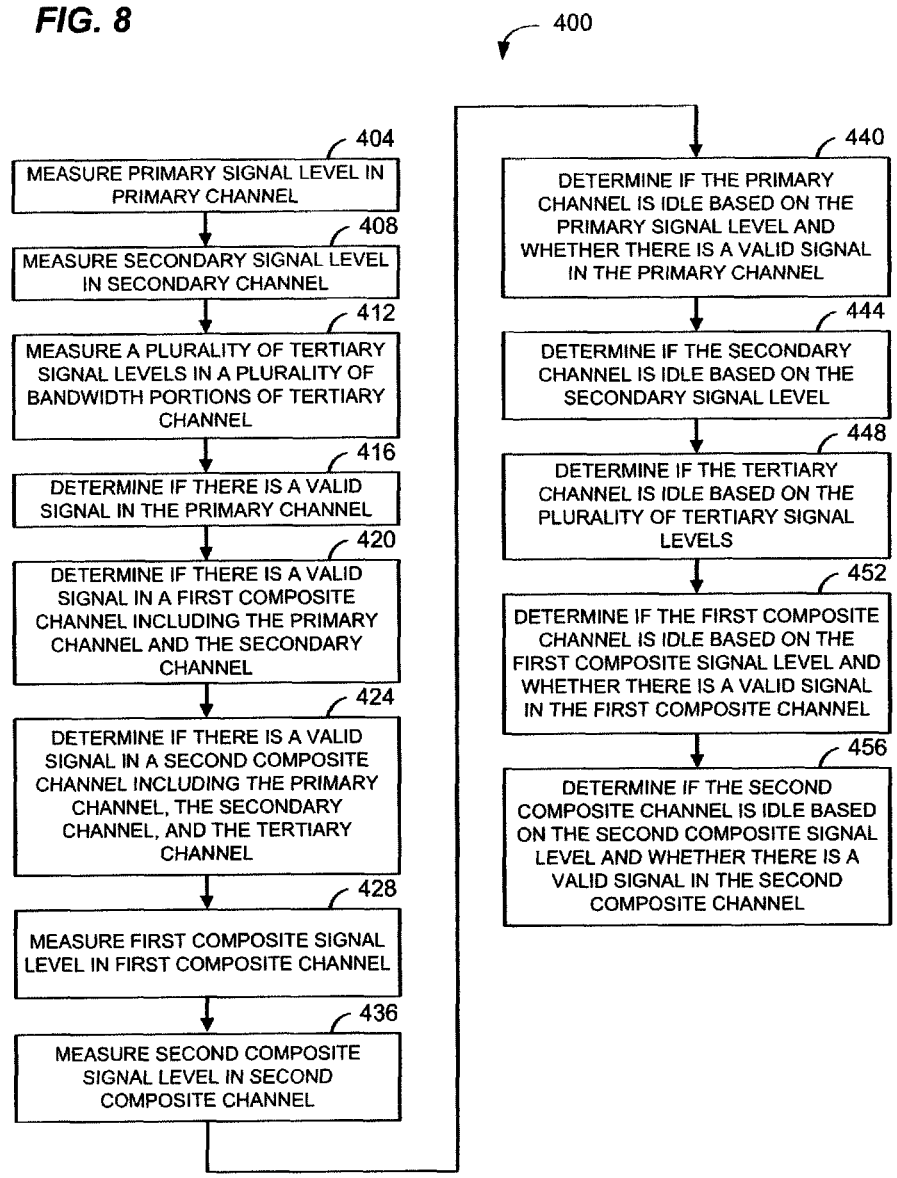
FIG. 8 is a flow diagram of an example clear channel assessment (CCA) method for use in a communication system utilizing a primary channel, a secondary channel, and a tertiary channel, according to an embodiment.

FIG. 8 is a flow diagram of an example CCA method 400 for use in a communication system utilizing a primary channel, a secondary channel, and a tertiary channel, according to an embodiment. Referring to FIG. 1, the network interface 16 (e.g., the PHY processing unit 20) of the AP 14 is configured to implement the method 400, in an embodiment. Additionally or alternatively, the network interface 27 (e.g., the PHY processing unit 29) of the client 25-1 is configured to implement the method 400 in an embodiment.

At block 404, a signal level in the primary channel (primary signal level) is measured. A suitable signal measurement technique is utilized. For example, block 404 includes measuring an energy level in the primary channel, in an embodiment and at least in scenarios in which the signal in the primary channel cannot be decoded. As another example, in scenarios in which the signal in the primary channel can be determined to be a valid signal, block 404 includes measuring a level of the signal at least over a preamble of the signal or some other suitable portion of the signal, in an embodiment. In an embodiment, block 404 comprises making two primary signal level measurements when the signal in the primary channel can be determined to be a valid signal.

At block 408, a signal level in the secondary channel (secondary signal level) is measured. A suitable signal measurement technique is utilized. For example, block 408 includes measuring an energy level in the secondary channel, in an embodiment.

At block 412, a plurality of signal levels in the tertiary channel (tertiary signal levels) is measured. In an embodiment, the tertiary channel has a wider bandwidth than the primary channel, and measuring the signal level in the tertiary channel comprises measuring respective signal levels in different bandwidth portions of the tertiary channel. In an embodiment, the tertiary channel includes a first bandwidth portion and a second bandwidth portion, and measuring the signal level in the tertiary channel comprises measuring a first tertiary signal level in the first bandwidth portion and measuring a second tertiary signal level in the second bandwidth portion. A suitable signal measurement technique is utilized to measure the signal level in each bandwidth portion. For example, block 412 includes measuring a respective energy level in each bandwidth portion of the tertiary channel, in an embodiment.

At block 416, it is determined whether there is a valid signal in the primary channel. For example, it may be determined whether there is a signal in the primary channel that conforms to the VHT communication protocol or a legacy communication protocol. A suitable technique for determining if there is a valid signal in the primary channel is utilized. In an embodiment, a result of block 416 is utilized by the block 404. For example, block 404 performs a particular type of signal level measurement when a valid signal is present in the primary channel, in an embodiment.

At block 420, it is determined whether there is a valid signal in a first composite channel including the primary channel and the secondary channel. For example, it may be determined whether there is a signal in the first composite channel that conforms to the VHT communication protocol or a legacy communication protocol. A suitable technique for determining if there is a valid signal in the first composite channel is utilized.

At block 424, it is determined whether there is a valid signal in a second composite channel including the primary channel, the secondary channel, and the tertiary channel. For example, it may be determined whether there is a signal in the second composite channel that conforms to the VHT communication protocol. A suitable technique for determining if there is a valid signal in the second composite channel is utilized.

At block 428, a signal level in the first composite channel (first composite signal level) is measured. A suitable signal measurement technique is utilized. For example, in scenarios in which the signal in the first composite channel can be determined to be a valid signal, block 428 includes measuring a level of the signal at least over a preamble of the signal or some other suitable portion of the signal, in an embodiment. Block 428 is not performed when it is determined at block 420 that there is not a valid signal in the first composite channel, in an embodiment.

At block 436, a signal level in the second composite channel (second composite signal level) is measured. A suitable signal measurement technique is utilized. For example, in scenarios in which the signal in the second composite channel can be determined to be a valid signal, block 428 includes measuring a level of the signal at least over a preamble of the signal or some other suitable portion of the signal, in an embodiment. Block 436 is not performed when it is determined at block 424 that there is not a valid signal in the second composite channel, in an embodiment.

At block 440, it is determined whether the primary channel is idle based on the primary signal level measured at block 404 and the determination of whether there is a valid signal in the primary channel at block 416. In an embodiment, block 440 includes comparing a primary signal level measurement made at block 404 to a first threshold, and determining that the primary channel is idle based on the comparison. For example, when the primary signal level measurement meets (e.g., exceeds) the first threshold, it is determined that the primary channel is not idle (i.e., busy). In an embodiment, the first threshold is based on a minimum modulation and coding rate sensitivity defined by the legacy communication protocol and/or the VHT communication protocol. In an embodiment, the first threshold is set to be at 20 dBm above the minimum modulation and coding rate sensitivity defined by the legacy communication protocol and/or the VHT communication protocol. In other embodiments, the first threshold is set in a suitable manner other than being based on the minimum modulation and coding rate sensitivity defined by the legacy communication protocol and/or the VHT communication protocol and/or other than at 20 dBm above the minimum modulation and coding rate sensitivity defined by the legacy communication protocol and/or the VHT communication protocol.

Also, block 440 includes comparing a primary signal level measurement made at block 404 to a second threshold, and determining that the primary channel is idle based on the comparison, at least when it is determined at block 416 that there is a valid signal in the primary channel. For example, when there is a valid signal in the primary channel and when the primary signal level measurement meets (e.g., exceeds) the second threshold, it is determined that the primary channel is busy. In an embodiment, the second threshold is lower than or equal to the first threshold. In an embodiment, the second threshold is set so that a start of a valid signal in the primary channel at a received signal level equal to or greater than a minimum modulation and coding rate sensitivity of the legacy communication protocol and/or the VHT communication protocol at a defined signal level results in detecting that the primary channel is busy with a defined probability within a defined amount of time. For example, in one embodiment, the second threshold is set so that a start of a valid signal in the primary channel at a received signal level greater at least at the minimum modulation and coding rate sensitivity of the legacy communication protocol and/or the VHT communication protocol results in detecting that the primary channel is busy with a probability greater than 90% within 4 microseconds. In other embodiments, the second threshold is set in other suitable ways.

In some scenarios, i) comparing a primary signal level measurement to the first threshold and ii) comparing a primary signal level measurement to the second threshold are not both performed. For example, if no valid signal is detected in the primary channel, comparing a primary signal level measurement to the second threshold is not performed, in an embodiment. As another example, if comparing a primary signal level measurement to the first threshold results in determining that the primary channel is busy, comparing a primary signal level measurement to the second threshold is not performed, in an embodiment. Similarly, as another example, if comparing a primary signal level measurement to the second threshold results in determining that the primary channel is busy, comparing a primary signal level measurement to the first threshold is not performed, in an embodiment.

At block 444, it is determined whether the secondary channel is idle based on the secondary signal level measured at block 408. In an embodiment, block 444 includes comparing a secondary signal level measurement made at block 408 to a threshold, and determining that the secondary channel is busy based on the comparison. For example, when the secondary signal level measurement meets (e.g., exceeds) the threshold, it is determined that the secondary channel is busy. In an embodiment, the threshold is based on a minimum modulation and coding rate sensitivity defined by the legacy communication protocol and/or the VHT communication protocol. In an embodiment, the threshold is set to be at most 20 dBm above the minimum modulation and coding rate sensitivity defined by the legacy communication protocol and/or the VHT communication protocol. In other embodiments, the threshold is set in a suitable manner other than being based on the minimum modulation and coding rate sensitivity defined by the legacy communication protocol and/or the VHT communication protocol. In an embodiment, the threshold utilized at block 444 is the same as the first threshold utilized at block 440. In other embodiments, the threshold utilized at block 444 is different than the first threshold utilized at block 440.

At block 448, it is determined whether the tertiary channel is idle based on the plurality of tertiary signal levels measured at block 412. In an embodiment, block 448 includes comparing a plurality of tertiary signal level measurements made at block 412 to one or more thresholds, and determining that the tertiary channel is idle based on the comparisons. For example, when at least one tertiary signal level measurement meets (e.g., exceeds) the threshold, it is determined that the tertiary channel is busy, in an embodiment. In an embodiment, the same threshold is utilized for all of the tertiary channel measurements, and the threshold is based on a minimum modulation and coding rate sensitivity defined by the legacy communication protocol and/or the VHT communication protocol. In an embodiment, the threshold is set to be at most 20 dBm above the minimum modulation and coding rate sensitivity defined by the legacy communication protocol and/or the VHT communication protocol. In other embodiments, the threshold is set in a suitable manner other than being based on the minimum modulation and coding rate sensitivity defined by the legacy communication protocol and/or the VHT communication protocol. In an embodiment, the threshold utilized at block 448 is the same as the first threshold utilized at block 440. In other embodiments, the threshold utilized at block 448 is different than the first threshold utilized at block 440. In some embodiments, different thresholds are utilized for different tertiary channel measurements corresponding to different bandwidth portions of the tertiary channel.

In some embodiments and/or scenarios, not all tertiary channel measurements are compared to a threshold at block 448. For example, if a first comparison results in determining that the tertiary channel is busy, subsequent comparisons of other tertiary channel measurements are not performed, at least in some embodiments. For example, if a first tertiary channel measurement corresponding to a first bandwidth portion of the tertiary channel indicates the tertiary channel is busy, subsequent comparisons of other tertiary channel measurements corresponding to other bandwidth portions of the tertiary channel are not performed.

At block 452, it is determined whether the first composite channel is idle based on the determination of whether there is a valid signal in the first composite channel at block 420 and the first composite signal level measured at block 428. In an embodiment, block 452 includes comparing a first composite signal level measurement made at block 428 to a threshold, and determining that the first composite channel is idle based on the comparison. For example, when the first composite signal level measurement meets (e.g., exceeds) the threshold, it is determined that the first composite channel is busy. In an embodiment, the threshold is based on a minimum modulation and coding rate sensitivity defined by the legacy communication protocol and/or the VHT communication protocol. In an embodiment, the threshold utilized at block 452 is greater than or equal to the second threshold utilized at block 440. In an embodiment, the threshold utilized at block 452 is set so that a start of a valid signal in the first composite channel at a received signal level equal to or greater than a minimum modulation and coding rate sensitivity of the legacy communication protocol and/or the VHT communication protocol results in detecting that the first composite channel is busy with a defined probability within a defined amount of time. For example, in one embodiment, the threshold is set so that a start of a valid signal in the first composite channel at a received signal level equal to or greater than a minimum modulation and coding rate sensitivity of the legacy communication protocol and/or the VHT communication protocol results in detecting that the first composite channel is busy with a probability greater than 90% within 4 microseconds. In other embodiments, the threshold is set in other suitable ways.

In at least some embodiments, block 452 is not performed when it is determined at block 420 that there is not a valid signal in the first composite channel. In an embodiment, it is determined that the first composite channel is idle when it is determined at block 420 that there is not a valid signal in the first composite channel. In an embodiment, it is determined that the first composite channel is idle when it is determined at block 420 that there is not a valid signal in the first composite channel and it is determined at blocks 440 and 444 that the primary channel is idle and the secondary channel is idle.

At block 456, it is determined whether the second composite channel is idle based on the determination of whether there is a valid signal in the second composite channel at block 424 and the second composite signal level measured at block 436. In an embodiment, block 456 includes comparing a second composite signal level measurement made at block 436 to a threshold, and determining that the second composite channel is idle based on the comparison. For example, when the second composite signal level measurement meets (e.g., exceeds) the threshold, it is determined that the second composite channel is busy. In an embodiment, the threshold is based on a minimum modulation and coding rate sensitivity defined by the VHT communication protocol. In an embodiment, the threshold utilized at block 456 is greater than or equal to the threshold utilized at block 452. In an embodiment, the threshold utilized at block 456 is set so that a start of a valid signal in the second composite channel at a received signal level equal to or greater than a minimum modulation and coding rate sensitivity of the VHT communication protocol results in detecting that the second composite channel is busy with a defined probability within a defined amount of time. For example, in one embodiment, the threshold is set so that a start of a valid signal in the second composite channel at a received signal level equal to or greater than a minimum modulation and coding rate sensitivity of the VHT communication protocol results in detecting that the second composite channel is busy with a probability greater than 90% within 4 microseconds. In other embodiments, the threshold is set in other suitable ways.

In at least some embodiments, block 456 is not performed when it is determined at block 424 that there is not a valid signal in the second composite channel. In an embodiment, it is determined that the second composite channel is idle when it is determined at block 424 that there is not a valid signal in the second composite channel. In an embodiment, it is determined that the second composite channel is idle when it is determined at block 424 that there is not a valid signal in the second composite channel and it is determined at blocks 440, 444, and 448 that the primary channel, the secondary channel, and the tertiary channel are idle.

Figure 9:
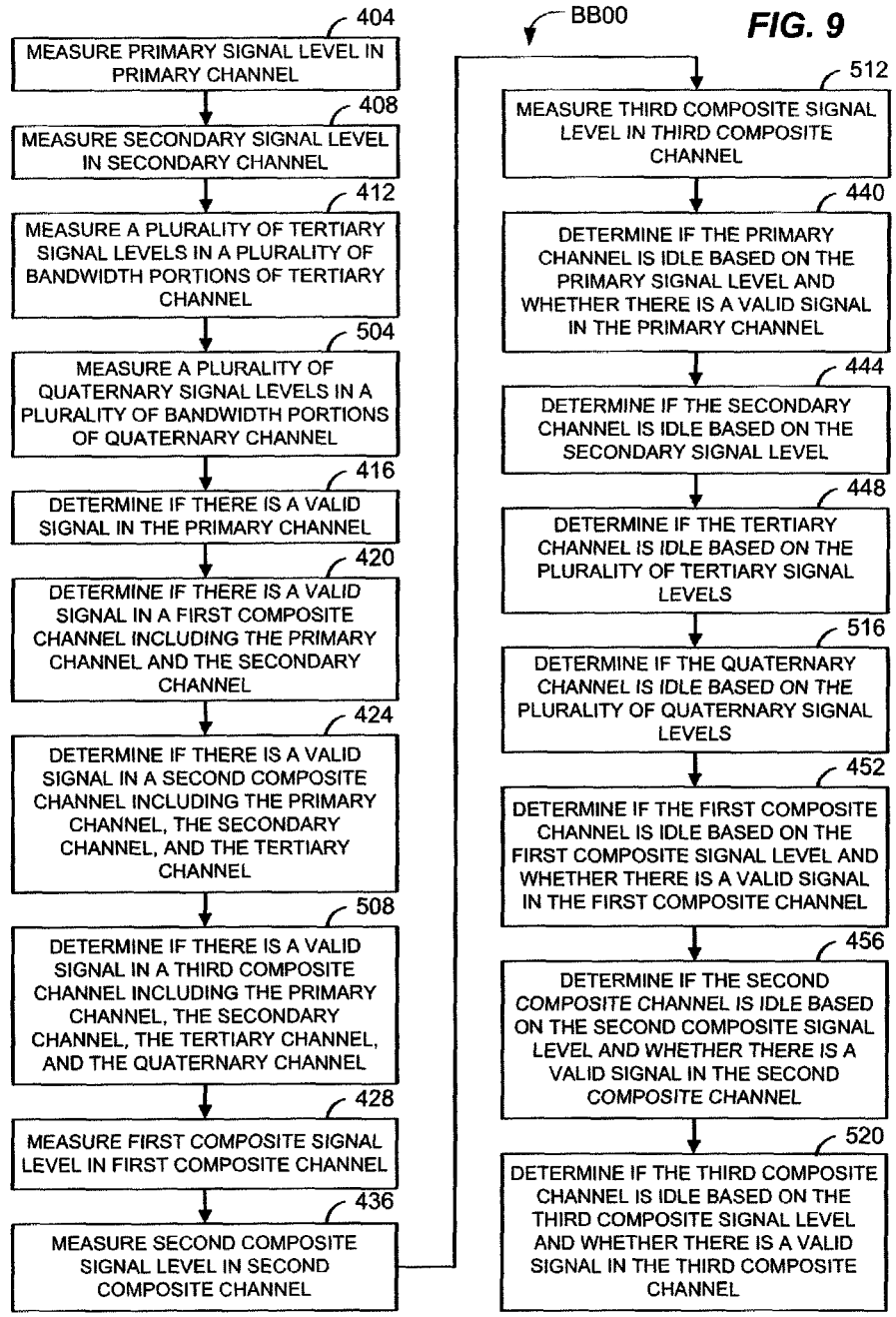
FIG. 9 is a flow diagram of an example CCA method for use in a communication system utilizing a primary channel, a secondary channel, a tertiary channel, and a quaternary channel, according to an embodiment.

FIG. 9 is a flow diagram of an example CCA method 500 for use in a communication system utilizing a primary channel, a secondary channel, a tertiary channel, and a quaternary channel, according to an embodiment. Referring to FIG. 1, the network interface 16 (e.g., the PHY processing unit 20) of the AP 14 is configured to implement the method 500, in an embodiment. Additionally or alternatively, the network interface 27 (e.g., the PHY processing unit 29) of the client 25-1 is configured to implement the method 500 in an embodiment. The method 500 is similar to the method 400 (FIG. 8), and like numbered blocks are not discussed.

At block 504, a plurality of signal levels in the quaternary channel (quaternary signal levels) are measured. In an embodiment, the quaternary channel has a wider bandwidth than the primary channel, and measuring the signal level in the quaternary channel comprises measuring respective signal levels in different bandwidth portions of the quaternary channel. In an embodiment, the quaternary channel includes a first bandwidth portion, a second bandwidth portion, a third bandwidth portion, and a fourth bandwidth portion, and measuring the signal level in the quaternary channel comprises measuring a first quaternary signal level in the first bandwidth portion, measuring a second quaternary signal level in the second bandwidth portion, measuring a third quaternary signal level in the third bandwidth portion, and measuring a fourth quaternary signal level in the fourth bandwidth portion. A suitable signal measurement technique is utilized to measure the signal level in each bandwidth portion. For example, block 504 includes measuring a respective energy level in each bandwidth portion of the quaternary channel, in an embodiment.

At block 508, it is determined whether there is a valid signal in a third composite channel including the primary channel, the secondary channel, the tertiary channel, and the quaternary channel. For example, it may be determined whether there is a signal in the third composite channel that conforms to the VHT communication protocol. A suitable technique for determining if there is a valid signal in the third composite channel is utilized.

At block 512, a signal level in the third composite channel (third composite signal level) is measured. A suitable signal measurement technique is utilized. For example, in scenarios in which the signal in the third composite channel can be determined to be a valid signal, block 512 includes measuring a level of the signal at least over a preamble of the signal or some other suitable portion of the signal, in an embodiment. Block 512 is not performed when it is determined at block 508 that there is not a valid signal in the second composite channel, in an embodiment.

At block 516, it is determined whether the quaternary channel is idle based on the plurality of quaternary signal levels measured at block 504. In an embodiment, block 516 includes comparing a plurality of quaternary signal level measurements made at block 504 to one or more thresholds, and determining that the quaternary channel is idle based on the comparisons. For example, when at least one quaternary signal level measurement meets (e.g. exceeds) the threshold, it is determined that the quaternary channel is busy, in an embodiment. In an embodiment, the same threshold is utilized for all of the quaternary channel measurements, and the threshold is based on a minimum modulation and coding rate sensitivity defined by the VHT communication protocol. In an embodiment, the threshold is set to be at most 20 dBm above the minimum modulation and coding rate sensitivity defined by the VHT communication protocol. In other embodiments, the threshold is set in a suitable manner other than being based on the minimum modulation and coding rate sensitivity defined by the legacy communication protocol and/or the VHT communication protocol. In an embodiment, the threshold utilized at block 512 is the same as the first threshold utilized at block 440. In other embodiments, the threshold utilized at block 512 is different than the first threshold utilized at block 440. In some embodiments, different thresholds are utilized for different quaternary channel measurements corresponding to different bandwidth portions of the quaternary channel.

In some embodiments and/or scenarios, not all quaternary channel measurements are compared to a threshold at block 516. For example, if a first comparison results in determining that the quaternary channel is busy, subsequent comparisons of other quaternary channel measurements are not performed, at least in some embodiments. For example, if a first quaternary channel measurement corresponding to a first bandwidth portion of the quaternary channel indicates the quaternary channel is busy, subsequent comparisons of other quaternary channel measurements corresponding to other bandwidth portions of the quaternary channel are not performed.

At block 520, it is determined whether the third composite channel is idle based on the determination of whether there is a valid signal in the third composite channel at block 508 and the third composite signal level measured at block 512. In an embodiment, block 520 includes comparing a third composite signal level measurement made at block 512 to a threshold, and determining that the third composite channel is idle based on the comparison. For example, when the third composite signal level measurement meets (e.g., exceeds) the threshold, it is determined that the third composite channel is busy. In an embodiment, the threshold is based on a minimum modulation and coding rate sensitivity defined by the VHT communication protocol. In an embodiment, the threshold utilized at block 520 is greater than or equal to the threshold utilized at block 452. In an embodiment, the threshold utilized at block 520 is greater than or equal to the threshold utilized at block 456. In an embodiment, the threshold utilized at block 520 is set so that a start of a valid signal in the third composite channel at a received signal level equal to or greater than a minimum modulation and coding rate sensitivity of the VHT communication protocol results in detecting that the third composite channel is busy with a defined probability within a defined amount of time. For example, in one embodiment, the threshold is set so that a start of a valid signal in the third composite channel at a received signal level equal to or greater than a minimum modulation and coding rate sensitivity of the VHT communication protocol results in detecting that the third composite channel is busy with a probability greater than 90% within 4 microseconds. In other embodiments, the threshold is set in other suitable ways.

In at least some embodiments, block 520 is not performed when it is determined at block 508 that there is not a valid signal in the third composite channel. In an embodiment, it is determined that the third composite channel is idle when it is determined at block 508 that there is not a valid signal in the second composite channel. In an embodiment, it is determined that the third composite channel is idle when it is determined at block 508 that there is not a valid signal in the third composite channel and it is determined at blocks 440, 444, 448, and 516 that the primary channel, the secondary channel, the tertiary channel, and the quaternary channel are idle.

Referring now to example methods 400 and 500, in some implementations, blocks of the methods 400 and 500 are performed in a different order than illustrated. For example, in some implementations, a first portion of a first block is performed, and then a second block is performed before a second portion of the first block is performed. Additionally, as discussed above, some blocks are not performed in some scenarios, and performance of a block can be dependent on the result of another block. Similarly, some portions of blocks are not performed in some scenarios, and performance of a portion of a block can be dependent on the result of another block.

In other embodiments, a method similar to the method 400 and/or the method 500 is utilized in a communication system utilizing a different number of channels. For example, a similar method is utilized in a communication system utilizing a primary channel, a secondary channel, a tertiary channel, a quaternary channel, and a quinary channel, according to an embodiment. In an embodiment, the quaternary channel includes a first bandwidth portion and a second bandwidth portion, and measuring the signal level in the quaternary channel comprises measuring a first quaternary signal level in the first bandwidth portion, and measuring a second quaternary signal level in the second bandwidth portion.

In an embodiment, a plurality of signal levels in the quinary channel (quinary signal levels) are measured. In an embodiment, the quinary channel includes a first bandwidth portion and a second bandwidth portion, and measuring the signal level in the quinary channel comprises measuring a first quinary signal level in the first bandwidth portion, and measuring a second quinary signal level in the second bandwidth portion.

Similar to block 508, in an embodiment, it is determined whether there is a valid signal in a fourth composite channel including the primary channel, the secondary channel, the tertiary channel, the quaternary channel, and the quinary channel. For example, it may be determined whether there is a signal in the fourth composite channel that conforms to the VHT communication protocol. Similar to block 512, in an embodiment, a signal level in the fourth composite channel (fourth composite signal level) is measured. Similar to block 516, in an embodiment, it is determined whether the quinary channel is idle based on the plurality of quinary signal levels. For example, when at least one quinary signal level measurement meets (e.g., exceeds) a threshold, it is determined that the quinary channel is busy, in an embodiment. In an embodiment, the same threshold is utilized for all of the quinary channel measurements, and the threshold is based on a minimum modulation and coding rate sensitivity defined by the VHT communication protocol. In an embodiment, the threshold is set to be at most 20 dBm above the minimum modulation and coding rate sensitivity defined by the VHT communication protocol. In other embodiments, the threshold is set in a suitable manner other than being based on the minimum modulation and coding rate sensitivity defined by the legacy communication protocol and/or the VHT communication protocol. In some embodiments and/or scenarios, not all quinary channel measurements are compared to a threshold. For example, if a first comparison results in determining that the quinary channel is busy, subsequent comparisons of other quinary channel measurements are not performed, at least in some embodiments.

Similar to block 520, in an embodiment, it is determined whether the fourth composite channel is idle based on the determination of whether there is a valid signal in the fourth composite channel and the fourth composite signal level. In an embodiment, determining whether the fourth composite channel is idle includes comparing a fourth composite signal level measurement to a threshold, and determining that the fourth composite channel is idle based on the comparison. For example, when the fourth composite signal level measurement meets (e.g. exceeds) the threshold, it is determined that the fourth composite channel is busy. In an embodiment, the threshold is based on a minimum modulation and coding rate sensitivity defined by the VHT communication protocol. In an embodiment, the threshold utilized is set so that a start of a valid signal in the fourth composite channel at a received signal level equal to or greater than a minimum modulation and coding rate sensitivity of the VHT communication protocol results in detecting that the fourth composite channel is busy with a defined probability within a defined amount of time. For example, in one embodiment, the threshold is set so that a start of a valid signal in the fourth composite channel at a received signal level equal to or greater than a minimum modulation and coding rate sensitivity of the VHT communication protocol results in detecting that the fourth composite channel is busy with a probability greater than 90% within 4 microseconds. In other embodiments, the threshold is set in other suitable ways.

In other embodiments, determinations of whether other composite channels are idle are similarly performed, where the other composite channels are composed of other combinations of the primary, secondary, tertiary, quaternary, and quinary channels. For example, another composite channel comprises the primary channel, the secondary channel, and the quaternary channel, but not the tertiary channel nor the quinary channel. As another example, another composite channel comprises the primary channel, the secondary channel, and the quinary channel, but not the tertiary channel nor the quaternary channel. As another example, another composite channel comprises the primary channel, the secondary channel, the tertiary channel, and the quinary channel, but not the quaternary channel. As another example, another composite channel comprises the primary channel, the secondary channel, the quaternary channel, and the quinary channel, but not the tertiary channel.

In some embodiments, a PHY processing unit, such as the PHY processing unit 20 of the AP 14 and/or the PHY processing unit 29 of the client 25-1, are configured to perform the method 400, the method 500, and/or a similar method. In an embodiment, the PHY processing unit generates one or more indications of whether one or more channels (e.g., a primary channel, a secondary channel, etc., a composite channel, etc.) are idle. In an embodiment, the indication is in a suitable format such as PHY-CCA.indication(STATE, channel-list), where "PHY-CCA.indication" includes a primitive indicating channel status, "STATE" is a parameter indicating BUSY or IDLE, and "channel-list" is a parameter indicating a list of one or more channels corresponding to the "STATE" parameter. For example, if it is determined that the secondary channel is IDLE, the indication is generated as PHY-CCA.indication(IDLE, Secondary). As another example, if it is determined that a composite channel including the primary channel, the secondary channel and the tertiary channel is BUSY, the indication is generated as PHY-CCA.indication(BUSY, Primary, Secondary, Tertiary). In an embodiment, the PHY processing unit sends the generated indication to a MAC processing unit such as the MAC processing unit 18 of the AP 14 and/or the MAC processing unit 28 of the client 25-1.

Figure 10:
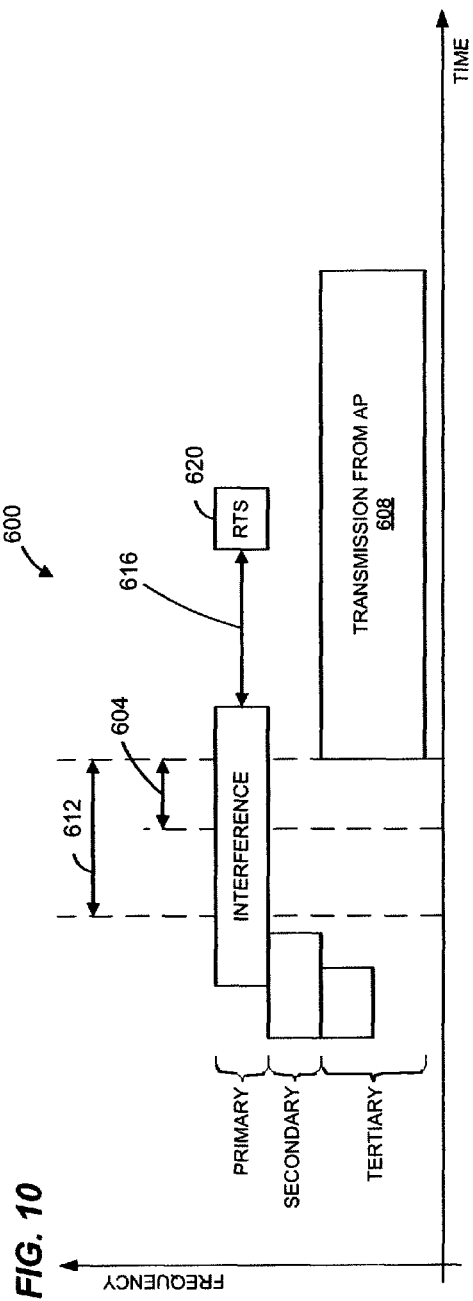
FIG. 10 is a diagram of an example transmission in a communication system in which the primary channel is busy (or not idle for at a specified time period), according to another embodiment.

In some embodiments, a station such as the AP 14 can gain a transmit opportunity (TXOP) on one or more of the secondary, tertiary, quaternary, etc., channels when the primary channel is busy. FIG. 10 is a diagram 600 of an example transmission in a communication system utilizing multiple channels such as described above, according to an embodiment. In the example illustrated in FIG. 10, a secondary channel and a tertiary channel are idle while a primary channel is busy (or idle for less than the time period 612). In an embodiment, when a tertiary channel is idle for at least a time period 604 while the primary channel is busy, a TXOP can be gained on the tertiary channel. In the example of FIG. 10, a TXOP on the tertiary channel has been gained by the AP 14, and the AP 14 generates a transmission 608 on the tertiary channel. In some embodiments and/or scenarios, the time period 604 is a suitable defined and/or determined time period such as the AIFS, the PIFS, or the DIFS described in the IEEE 802.11 Standard. In an embodiment, when a tertiary channel is idle for at least a time period 612 while the primary channel is busy, a TXOP can be gained on the tertiary channel. In some embodiments and/or scenarios, the time period 612 is a suitable time period determined based on the time period 604. For example, in an embodiment, the time period 612 is determined as a sum of the time period 604 with a suitable additional time period such as a back-off time period. In an embodiment, the back-off time period is a randomly generated time period such as described in the IEEE 802.11 Standard. In some embodiments and/or scenarios, the time period 612 is a suitable defined and/or determined time period not determined based on the time period 604 and/or not based on a randomly generated time period. In some embodiments and/or scenarios, the time period 604 is PIFS, whereas the time period 612 is DIFS or AIFS, at least in some scenarios.

In other embodiments, the AP utilizes another channel (e.g., a quaternary channel or a quinary channel) when the primary channel is busy. In other embodiments, the AP utilizes a composite channel (e.g., comprising the tertiary channel and a quaternary channel and/or a quinary channel) when the primary channel is busy. In some embodiments, the secondary channel cannot be utilized when the primary channel is busy. In other embodiments, the secondary channel can be utilized when the primary channel is busy, such as by itself or as part of a composite channel. In some embodiments in which the AP 14 utilizes more than one of the secondary channel, the tertiary channel, etc., the AP 14 first determines whether at least one of the secondary channel, the tertiary channel, etc., is idle for at least the time period 612. In an embodiment, the AP 14 also first determines whether the other(s) of the secondary channel, the tertiary channel, etc., are idle for at least the time period 604.

In some embodiments, a station such as the client 25-1 can utilize the primary channel while the AP is transmitting on the tertiary channel (or on another channel such as a quaternary channel or a composite channel) and after the primary channel is no longer busy. For example, in FIG. 10, the primary channel eventually becomes idle for a period. In an embodiment, when primary channel is idle for at least a time period 616, a client can utilize the primary channel. In an embodiment, when a client wishes to utilize the primary channel, the client transmits a request to send (RTS) transmission 620. If the client receives a clear to send (CTS) correctly, the client is permitted to utilize the primary channel and optionally the secondary channel if idle.

In another embodiment, when a client wishes to utilize the primary channel, the client transmits short frame requesting an immediate acknowledgment. The time period 616 is a suitable time period. In some embodiments and/or scenarios, the time period 616 is a time period determined based on a back-off time period. In an embodiment, the back-off time period is a randomly generated time period such as described in the IEEE 802.11 Standard. In some embodiments and/or scenarios, the time period 616 is determined based on the back-off time period and a suitable defined and/or determined time period such as PIFS. DIFS, or AIFS described in the IEEE 802.11 Standard.

In some embodiments, if a secondary channel, tertiary channel, etc., cannot be accessed (e.g., it is busy), a station such as the AP 14 generates a new back-off time period. In an embodiment, if a secondary channel, tertiary channel, etc., cannot be accessed (e.g., it is busy), a station such as the AP 14 freezes a back-off timer and restarts the timer once the secondary channel, the tertiary channel, etc., becomes idle.

In some embodiments, a station such as the client device 25-1 can gain a TXOP on one or more of the secondary, tertiary, quaternary, etc., channels when the primary channel is busy in a manner similar to that discussed above.

In some embodiments, a first NAV for devices in the communication system and for the primary channel and the secondary channel are set in response to a transmission in the primary channel, whereas a second NAV for devices in the communication system and for one or more of the tertiary channel, the quaternary channel, etc., are set in response to a transmission in one or more of the tertiary channel, the quaternary channel, etc. In other embodiments, a NAV for devices in the communication system and for the all channels utilized by the communication system are set in response to a transmission in the primary channel. In other embodiments, a NAV for devices in the communication system and for the all channels utilized by the communication system are set in response to a transmission in any of channels utilized by the communication system.

Figure 11C:
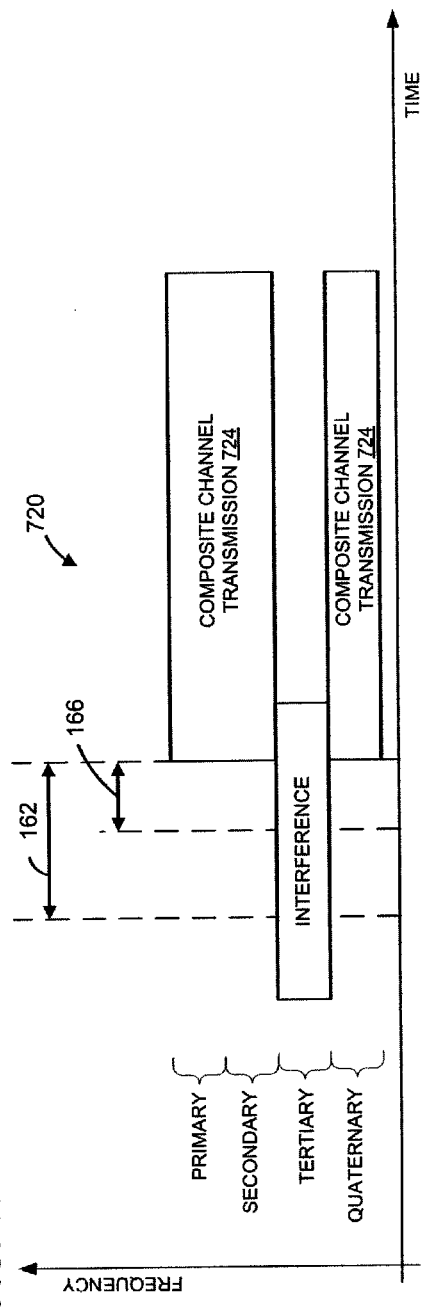

FIGS. 11A-11F are diagrams of example transmissions utilizing composite channels (or a single channel) such as described above. FIG. 11A is a diagram 700 of an example composite transmission in a communication system utilizing a primary channel, a secondary channel, and a tertiary channel, according to an embodiment. In an embodiment, the primary channel and the secondary channel have the same bandwidth, whereas the tertiary channel has a larger bandwidth than the primary channel. In one specific illustrative example, the primary channel and the secondary channel have a 20 MHz bandwidth, whereas the tertiary channel has a 40 MHz bandwidth. In other embodiments, other suitable bandwidths are utilized. In other embodiments, at least the primary channel and the secondary channel have different bandwidths.

In the example illustrated in FIG. 11A, the primary channel and the tertiary channel are idle while the secondary channel is busy (or idle for less than the time period 166). In an embodiment, when the primary channel is idle for at least a time period 162 and the tertiary channel is idle for at least the time period 166, a composite channel comprising the primary channel and the tertiary channel is formed. In the example of FIG. 11A, the AP 14 generates a transmission 704 on the composite channel.

FIG. 11B is a diagram 710 of an example composite transmission in a communication system utilizing a primary channel, a secondary channel, a tertiary channel, and a quaternary channel, according to an embodiment. In an embodiment, the primary channel, the secondary channel, the tertiary channel, and the quaternary channel have the same bandwidth. In one specific illustrative example, the primary channel, the secondary channel, the tertiary channel, and the quaternary channel each have a 20 MHz bandwidth. In other embodiments, other suitable bandwidths are utilized. In other embodiments, at two of the primary channel, the secondary channel, the tertiary channel, and the quaternary channel have different bandwidths.

In the example illustrated in FIG. 11B, the primary channel, the secondary channel, and the tertiary channel are idle while the quaternary channel is busy (or idle for less than the time period 166). In an embodiment, when the primary channel is idle for at least a time period 162 and each of the secondary channel and the tertiary channel is idle for at least the time period 166, a composite channel comprising the primary channel, the secondary channel, and the tertiary channel is formed. In the example of FIG. 11B, the AP 14 generates a transmission 714 on the composite channel.

FIG. 11C is a diagram 720 of an example composite transmission in a communication system utilizing a primary channel, a secondary channel, a tertiary channel, and a quaternary channel, according to an embodiment. In an embodiment, the primary channel, the secondary channel, the tertiary channel, and the quaternary channel have the same bandwidth. In one specific illustrative example, the primary channel, the secondary channel, the tertiary channel, and the quaternary channel each have a 20 MHz bandwidth. In other embodiments, other suitable bandwidths are utilized. In other embodiments, at two of the primary channel, the secondary channel, the tertiary channel, and the quaternary channel have different bandwidths.

In the example illustrated in FIG. 11C, the primary channel, the secondary channel, and the quaternary channel are idle while the tertiary channel is busy (or idle for less than the time period 166). In an embodiment, when the primary channel is idle for at least a time period 162 and each of the secondary channel and the quaternary channel is idle for at least the time period 166, a composite channel comprising the primary channel, the secondary channel, and the quaternary channel is formed. In the example of FIG. 11C, the AP 14 generates a transmission 724 on the composite channel.

Figure 11D:
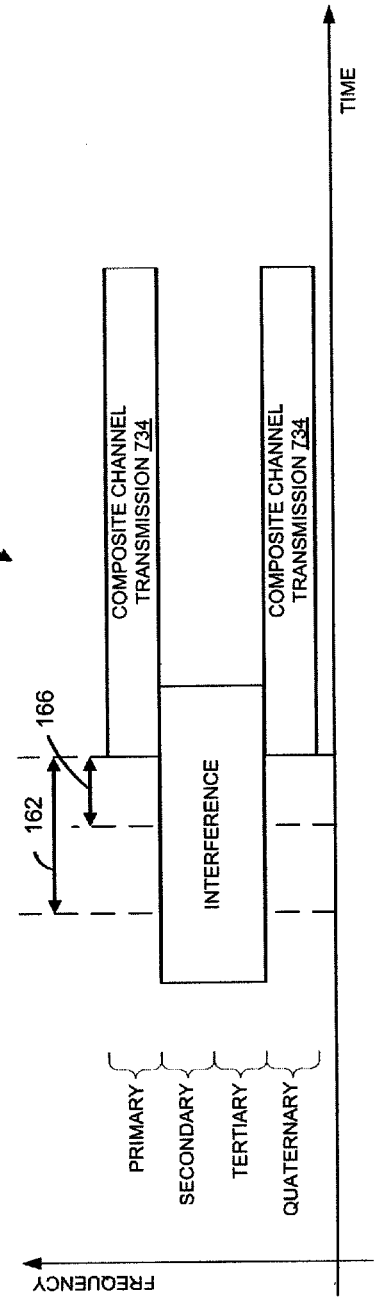

FIG. 11D is a diagram 730 of an example composite transmission in a communication system utilizing a primary channel, a secondary channel, a tertiary channel, and a quaternary channel, according to an embodiment. In an embodiment, the primary channel, the secondary channel, the tertiary channel, and the quaternary channel have the same bandwidth. In one specific illustrative example, the primary channel, the secondary channel, the tertiary channel, and the quaternary channel each have a 20 MHz bandwidth. In other embodiments, other suitable bandwidths are utilized. In other embodiments, at two of the primary channel, the secondary channel, the tertiary channel, and the quaternary channel have different bandwidths.

In the example illustrated in FIG. 11D, the primary channel and the quaternary channel are idle while the secondary channel and the tertiary channel are busy (or idle for less than the time period 166). In an embodiment, when the primary channel is idle for at least a time period 162 and the quaternary channel is idle for at least the time period 166, a composite channel comprising the primary channel and the quaternary channel is formed. In the example of FIG. 11D, the AP 14 generates a transmission 734 on the composite channel.

FIG. 11E is a diagram 740 of an example composite transmission in a communication system utilizing a primary channel, a secondary channel, and a tertiary channel, according to an embodiment. In an embodiment, the primary channel and the secondary channel have the same bandwidth, whereas the tertiary channel has a larger bandwidth than the primary channel. In one specific illustrative example, the primary channel and the secondary channel have a 20 MHz bandwidth, whereas the tertiary channel has a 40 MHz bandwidth. In other embodiments, other suitable bandwidths are utilized. In other embodiments, at least the primary channel and the secondary channel have different bandwidths.

In the example illustrated in FIG. 11E, the primary channel and the secondary channel are busy (or idle for less than the time period 162 and/or the time period 166) while the tertiary channel is idle. In an embodiment, when the tertiary channel is idle for at least a time period 162, the tertiary channel is utilized. In the example of FIG. 11E, the AP 14 generates a transmission 744 on the tertiary channel.

FIG. 11F is a diagram 730 of an example composite transmission in a communication system utilizing a primary channel, a secondary channel, a tertiary channel, and a quaternary channel, according to an embodiment. In an embodiment, the primary channel, the secondary channel, the tertiary channel, and the quaternary channel have the same bandwidth. In one specific illustrative example, the primary channel, the secondary channel, the tertiary channel, and the quaternary channel each have a 20 MHz bandwidth. In other embodiments, other suitable bandwidths are utilized. In other embodiments, at two of the primary channel, the secondary channel, the tertiary channel, and the quaternary channel have different bandwidths.

In the example illustrated in FIG. 11F, the primary channel and the tertiary channel are idle while the secondary channel and the quaternary channel are busy (or idle for less than the time period 166). In an embodiment, when the primary channel is idle for at least a time period 162 and the tertiary channel is idle for at least the time period 166, a composite channel comprising the primary channel and the tertiary channel is formed. In the example of FIG. 11F, the AP 14 generates a transmission 754 on the composite channel.

In some embodiments, a transmission by the AP 14 in one or more of the secondary channel, the tertiary channel, etc., and not the primary channel, will not cause a legacy station to set a NAV of the legacy station. In some embodiments, when a legacy station wins the primary channel while the AP 14 transmits in one or more of the secondary channel, the tertiary channel, etc., the legacy station can transmit without first sending an RTS to the AP 14.

In some embodiments in which the AP 14 has obtained a TXOP with the primary channel and one or more of the secondary channel, the tertiary channel, etc., the AP can utilize the primary channel and the one or more of the secondary channel, the tertiary channel, etc., for the entire TXOP. In some embodiments in which the AP 14 has obtained a TXOP with the primary channel and one or more of the secondary channel, the tertiary channel, etc., the AP can transmit in the primary channel but not one or more of the secondary channel, the tertiary channel, etc., during at least some portions of the TXOP.

In some embodiments in which the AP 14 has obtained an TXOP with a first set of the primary channel, the secondary channel, etc., but not a second set of the primary channel, the secondary channel, etc., the AP can utilize one or more of the secondary channel, the tertiary channel, etc., in the second set during the TXOP if the one or more of the secondary channel, the tertiary channel, etc., in the second set become idle for at least a defined time period such as the PIFS.

At least some of the various blocks, operations, and techniques described above may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of performing clear channel assessment (CCA) in a communication system that utilizes at least a primary channel, a secondary channel, and a tertiary channel, the method comprising:
 measuring a primary channel signal level in the primary channel;
 measuring a secondary channel signal level in the secondary channel;
 measuring a first tertiary channel signal level in a first bandwidth portion of the tertiary channel;
 measuring a second tertiary channel signal level in a second bandwidth portion of the tertiary channel;
 determining whether the primary channel is idle based on the primary channel signal level;
 determining whether the secondary channel is idle based on the secondary channel signal level;
 determining whether a valid signal is received via a first composite channel including the primary channel and the secondary channel;
 determining whether the first composite channel is idle based on whether a valid signal was received via the first composite channel;
 determining whether the tertiary channel is idle based on the first tertiary channel signal level and the second tertiary channel signal level, wherein a bandwidth of the tertiary channel is at least twice a bandwidth of the primary channel;
 determining whether a valid signal is received via a second composite channel including the first composite channel and the tertiary channel;
 measuring a second composite channel signal level in the second composite channel at least when it is determined that a valid signal was received via the second composite channel; and
 determining whether the second composite channel is idle based on i) whether the first composite channel was determined to be idle, ii) whether the tertiary channel was determined to be idle, and iii) whether a valid signal was received via the second composite channel, wherein, at least when it is determined that a valid signal was received via the second composite channel, determining whether the second composite channel is idle is further based on iv) the second composite channel signal level.

2. A method according to claim 1, wherein determining whether the tertiary channel is idle comprises determining that the tertiary channel is not idle when at least one of i) the first tertiary channel signal level meets a first threshold, and ii) the second tertiary channel signal level meets a second threshold.

3. A method according to claim 2, wherein the first threshold and the second threshold are equal.

4. A method according to claim 2, wherein first threshold and the second threshold are based on a minimum modulation and coding rate sensitivity.

5. A method according to claim 1, wherein measuring the primary channel signal level in the primary channel comprises:
making a first signal level measurement; and
making a second signal level measurement at least when it is determined that a valid signal was received in the primary channel.

6. A method according to claim 1, further comprising:
measuring a plurality of quaternary channel signal levels in a plurality of bandwidth portions of a quaternary channel; and
determining whether the quaternary channel is idle based on the plurality of quaternary channel signal levels.

7. A method according to claim 6, further comprising:
determining whether a valid signal is received via a third composite channel including the primary channel, the secondary channel, the tertiary channel, and the quaternary channel;
measuring a third composite channel signal level in the third composite channel at least when it is determined that a valid signal was received via the third composite channel; and
determining whether the third composite channel is idle based on i) whether a valid signal was received via the third composite channel,
wherein, at least when it is determined that a valid signal was received via the third composite channel, determining whether the third composite channel is idle is further based on ii) the third composite channel signal level.

8. A communication device, comprising:
a network interface configured to
measure a primary channel signal level in a primary channel,
measure a secondary channel signal level in a secondary channel,
measure a first tertiary channel signal level in a first bandwidth portion of a tertiary channel,
measure a second tertiary channel signal level in a second bandwidth portion of the tertiary channel,
determine whether the primary channel is idle based on the primary channel signal level,
determine whether the secondary channel is idle based on the secondary channel signal level,
determining whether a valid signal is received via a first composite channel including the primary channel and the secondary channel,
determining whether the first composite channel is idle based on whether a valid signal was received via the first composite channel,
determine whether the tertiary channel is idle based on the first tertiary channel signal level and the second tertiary channel signal level, wherein a bandwidth of the tertiary channel is at least twice a bandwidth of the primary channel,
determine whether a valid signal is received via a second composite channel including the first composite channel and the tertiary channel,
measure a second composite channel signal level in the second composite channel at least when it is determined that a valid signal was received via the second composite channel, and
determine whether the second composite channel is idle based on i) whether the first composite channel was determined to be idle, ii) whether the tertiary channel was determined to be idle, iii) whether a valid signal was received via the second composite channel, and
at least when it is determined that a valid signal was received via the second composite channel, determine whether the second composite channel is idle further based on iv) the second composite channel signal level.

9. A communication device according to claim 8, wherein the network interface is configured to determine that the tertiary channel is not idle when at least one of i) the first tertiary channel signal level meets a first threshold, and ii) the second tertiary channel signal level meets a second threshold.

10. A communication device according to claim 9, wherein the first threshold and the second threshold are equal.

11. A communication device according to claim 9, wherein first threshold and the second threshold are based on a minimum modulation and coding rate sensitivity.

12. A communication device according to claim 8, wherein the network interface is configured to
make a first signal level measurement for the primary channel, and
make a second signal level measurement for the primary channel at least when it is determined that a valid signal was received in the primary channel.

13. A communication device according to claim 8, wherein the network interface is configured to
measure a plurality of quaternary channel signal levels in a plurality of bandwidth portions of a quaternary channel, and
determine whether the quaternary channel is idle based on the plurality of quaternary channel signal levels.

14. A communication device according to claim 13, wherein the network interface is configured to
determine whether a valid signal is received via a third composite channel including the primary channel, the secondary channel, the tertiary channel, and the quaternary channel,
measure a third composite channel signal level in the third composite channel at least when it is determined that a valid signal was received via the third composite channel, and
determine whether the third composite channel is idle based on i) whether a valid signal was received via the third composite channel, and
at least when it is determined that a valid signal was received via the third composite channel, determine whether the third composite channel is idle further based on ii) the third composite channel signal level.

* * * * *